(12) United States Patent
Ikeno et al.

(10) Patent No.: US 6,580,485 B1
(45) Date of Patent: Jun. 17, 2003

(54) LIQUID CRYSTAL DISPLAY APPARATUS HAVING IMPROVED GRAY SCALE DISPLAY CHARACTERISTICS

(75) Inventors: Hidenori Ikeno, Tokyo (JP); Teruaki Suzuki, Tokyo (JP); Hiroshi Kanoh, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/668,779

(22) Filed: Sep. 22, 2000

Related U.S. Application Data

(62) Division of application No. 09/347,237, filed on Jul. 2, 1999, now Pat. No. 6,160,602, which is a division of application No. 08/840,389, filed on Apr. 29, 1997, now Pat. No. 6,008,875.

(30) Foreign Application Priority Data

Apr. 30, 1996 (JP) ............................................. 8-108812
Nov. 29, 1996 (JP) ............................................. 8-319465

(51) Int. Cl.$^7$ ...................... G02F 1/1333; G02F 1/1343
(52) U.S. Cl. ...................... 349/122; 349/138; 349/139; 349/158
(58) Field of Search .............................. 349/117, 138, 349/122, 129, 113, 158

(56) References Cited

U.S. PATENT DOCUMENTS

| | | | |
|---|---|---|---|
| 4,456,336 A | * | 6/1984 | Chung et al. ............... 350/338 |
| 4,519,678 A | * | 5/1985 | Komatsubara et al. ....... 350/338 |
| 4,632,514 A | * | 12/1986 | Ogawa et al. .............. 350/339 |
| 4,693,559 A | * | 9/1987 | Baeger ....................... 350/334 |
| 4,861,143 A | * | 8/1989 | Yamazaki et al. .......... 350/350 |
| 4,909,606 A | | 3/1990 | Wada et al. ................. 350/347 |
| 5,011,624 A | | 4/1991 | Yamagishi et al. ......... 252/299.5 |
| 5,139,340 A | * | 8/1992 | Okumura ..................... 359/63 |
| 5,189,540 A | | 2/1993 | Nakamura et al. .......... 359/102 |
| 5,268,783 A | | 7/1993 | Yoshinaga et al. ......... 359/103 |
| 5,283,675 A | | 2/1994 | Ooi et al. ...................... 359/51 |
| 5,291,323 A | | 3/1994 | Ohnishi et al. ............... 359/73 |
| 5,337,174 A | * | 8/1994 | Wada et al. ................... 359/73 |

(List continued on next page.)

FOREIGN PATENT DOCUMENTS

| | | | |
|---|---|---|---|
| GB | 8038484 | 12/1980 | ........... G02F/1/133 |
| JP | 58002821 | 1/1983 | ........... G02F/1/133 |
| JP | 59-15279 | 1/1984 | ............ G09F/9/00 |
| JP | 62-262022 | 11/1987 | ........... G02F/1/133 |
| JP | 1200239 | 8/1989 | ........... G02F/1/133 |
| JP | 2-126227 | 5/1990 | ......... G02F/1/1333 |
| JP | 4-140722 | 5/1992 | ......... G02F/1/1335 |
| JP | 04-141630 | 5/1992 | ........... G02F/1/137 |
| JP | 5-027242 | 2/1993 | ......... G02F/1/1337 |
| JP | 5-196815 | 8/1993 | ............ G02B/5/30 |
| JP | 6-037795 | 2/1994 | ........... H04L/12/48 |
| JP | 6-281937 | 10/1994 | ......... G02F/1/1337 |
| JP | 7-248498 | 9/1995 | ......... G02F/1/1337 |

OTHER PUBLICATIONS

*Invited Paper: A Reflective a–N\*GH–LCD and Its Ergonomic Characterization and Optimization*; By: T Sugiyama, T. Hashimoto and K. Katoh, Stanley Electric Co., Ltd., Kanagawa, Japan and by H. Suzuki, Y. Iwamoto, Y Iimura and S. Kobayashi, Tokyo University of Agriculture and Technology, Tokyo, Japan; SID 96 DIGEST; pp. 35–38.

*Primary Examiner*—William L. Sikes
*Assistant Examiner*—Tarifur R. Chowdhury
(74) *Attorney, Agent, or Firm*—Hayes Soloway PC

(57) ABSTRACT

In a liquid crystal display apparatus including two electrodes and a twisted-mode type liquid crystal layer inserted between the electrodes, an electric field in the liquid crystal layer between the electrodes is changed within one pixel, when a voltage is applied between the electrodes.

8 Claims, 28 Drawing Sheets

U.S. PATENT DOCUMENTS

| | | | |
|---|---|---|---|
| 5,408,345 A | 4/1995 | Mitsui et al. | 359/59 |
| 5,473,455 A | 5/1995 | Koike et al. | 359/76 |
| 5,456,967 A * | 10/1995 | Nezu | 428/141 |
| 5,497,255 A | 3/1996 | Yamazaki et al. | 359/72 |
| 5,499,126 A * | 3/1996 | Abileah et al. | 359/68 |
| 5,559,617 A | 9/1996 | Mitsui et al. | 359/73 |
| 5,589,959 A | 12/1996 | Hikmet | 349/88 |
| 5,610,741 A | 3/1997 | Kimura | 349/113 |
| 5,619,356 A * | 4/1997 | Kozo et al. | 349/99 |
| 5,638,197 A | 10/1997 | Gunning, III et al. | 349/96 |
| 5,684,551 A | 11/1997 | Nakamura et al. | 349/99 |
| 5,714,247 A * | 2/1998 | Kuo et al. | 428/323 |
| 5,724,111 A * | 3/1998 | Mizobata et al. | 349/112 |
| 5,737,043 A | 7/1998 | Takaya | 349/58 |
| 5,877,832 A * | 3/1999 | Shimada | 349/138 |
| 5,940,154 A * | 8/1999 | Ukita et al. | 349/113 |
| 6,141,073 A * | 10/2000 | Sasaki et al. | 349/122 |

* cited by examiner

LIQUID CRYSTAL DISPLAY APPARATUS HAVING IMPROVED GRAY SCALE DISPLAY CHARACTERISTICS

This application is a division of Ser. No. 09/347,237 filed Jul. 2, 1999, now U.S. Pat. No. 6,160,602, which is a divisional of Ser. No. 08/840,389 filed Apr. 29, 1997, now U.S. Pat. No. 6,008,875.

BACKGROUND OF THE INVENTION

1. Field of the Invention

The present invention relates to a twisted nematic (TN)-mode liquid crystal display (LCD) apparatus capable of improving gray scale display characteristics.

2. Description of the Related Art

In a prior art TN-mode LCD apparatus, twisted-mode type liquid crystal is inserted between two plane electrodes. In the prior art LCD apparatus, when the twisted angle of liquid-crystal molecules in the liquid crystal is larger than a value around 270', the tilt angle of liquid crystal molecules has an S shaped relationship to the voltage applied between the electrodes. Therefore, the transient orientation state of liquid crystal molecules during a rising voltage is different from that during a falling voltage. As a result, when an intermediate voltage between a high voltage and a low voltage is applied between the electrodes there are two orientation states of liquid crystal molecules mixed within one pixel. Thus, a large hysteresis is generated in the voltage-to-light transmittance characteristics, so that a gray scale display is impossible.

SUMMARY OF THE INVENTION

It is an object of the present invention to provide a TN-mode LCD apparatus capable of improving gray scale display characteristics even when the twisted angle of liquid crystal molecules is large.

According to the present invention, in a liquid crystal display apparatus including two electrodes and a twisted-mode type liquid crystal layer inserted between the electrodes, an electric field in the liquid crystal layer between the first and second electrodes is changed within one pixel, when a voltage is applied between the electrodes.

Also, in a liquid crystal display apparatus including two electrodes, two oriented layers formed on inner surfaces of the electrodes, respectively, and a twisted-mode type liquid crystal layer inserted between the oriented layers, one of the electrodes has an uneven surface, so that pretilt angles of liquid crystal molecules in the liquid crystal layer are fluctuated within one pixel.

Further, in a liquid crystal display apparatus including two plane electrodes, two oriented layers formed on inner surfaces of the electrodes, respectively, and a twisted-mode type liquid crystal layer inserted between the oriented layers, one of the oriented layers is divided into a plurality of domains each receiving rubbing processes of different directions, so that pretilt angles of liquid crystal molecules in the liquid crystal layer are fluctuated within one pixel.

In addition, in a liquid crystal display apparatus including two plane electrodes, two oriented layers formed on inner surfaces of the electrodes, respectively, and a twisted-mode type liquid crystal layer inserted between the oriented layers, the liquid crystal layer includes a polymer network generated by polymerization of monomer, so that pretilt angles of liquid crystal molecules in the liquid crystal layer are fluctuated within one pixel.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENTS

Figure 2:
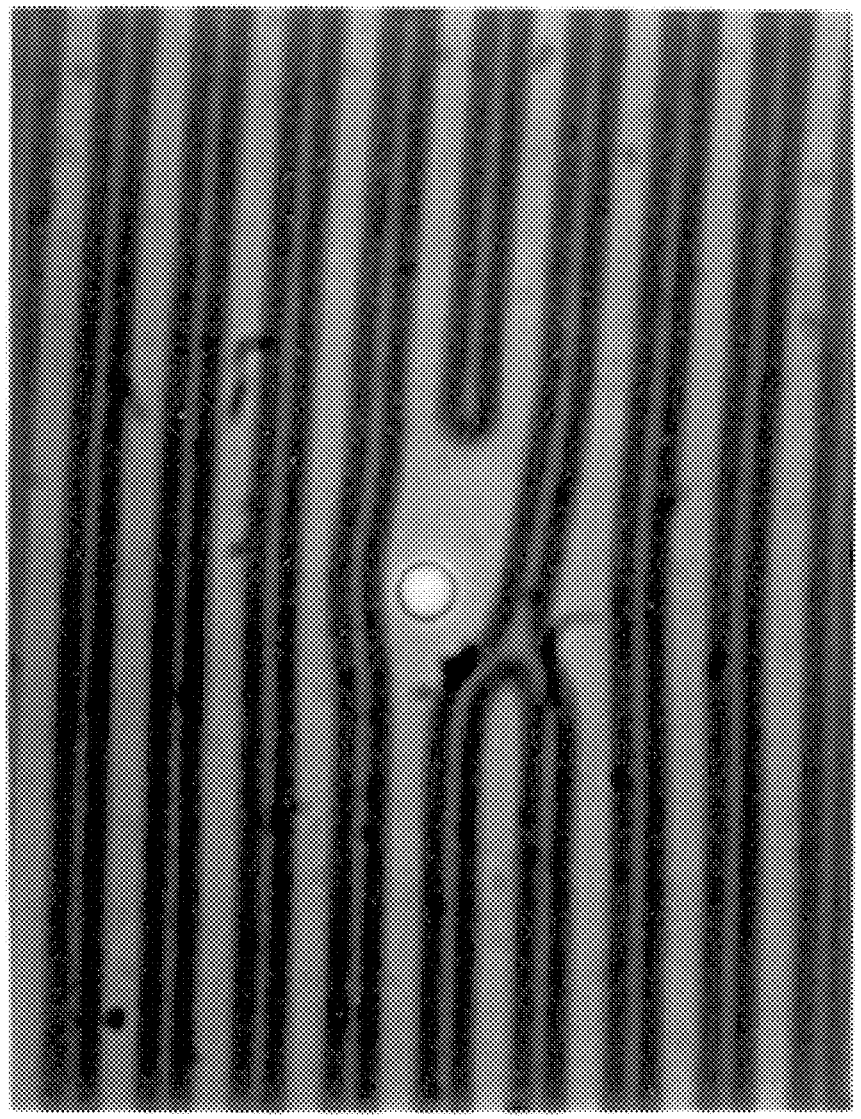
FIG. 2 is a photograph showing an orientation defect in the liquid crystal layer of FIG. 1.
Figure 3:
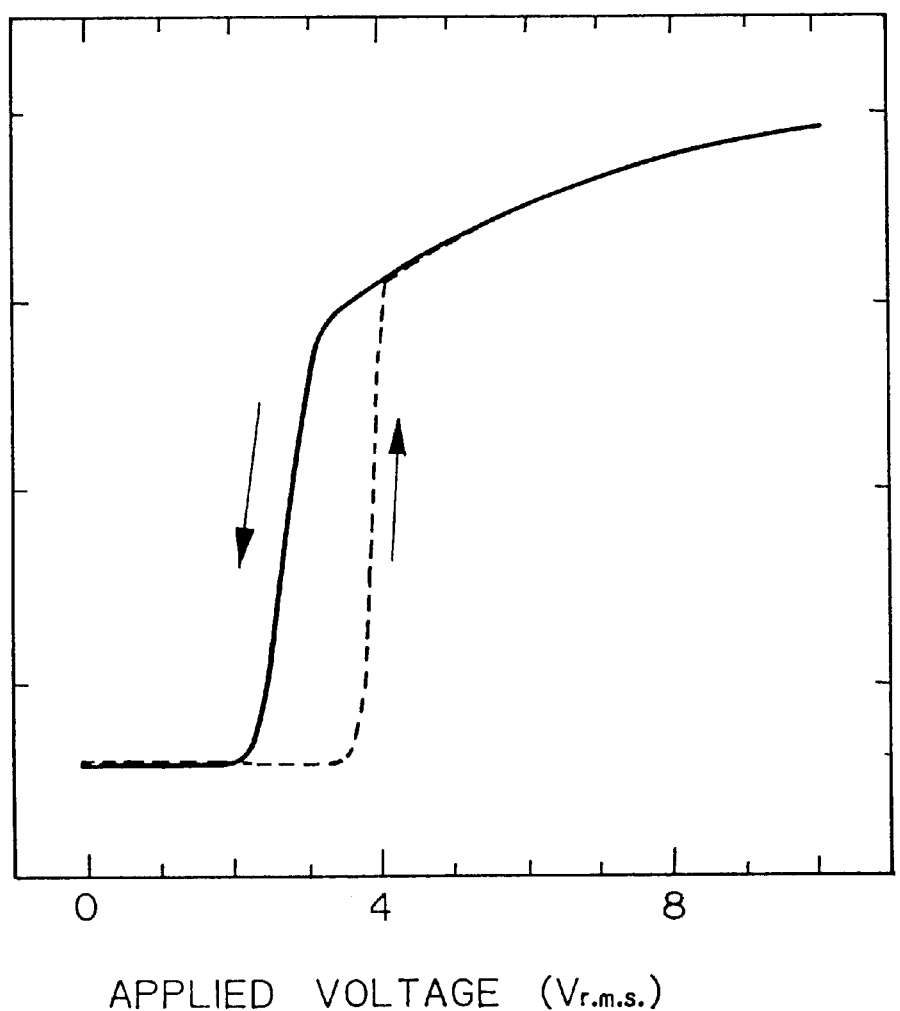
FIG. 3 is a graph showing the voltage-to-light transmittance characteristics of the liquid crystal layer of FIG. 1.

Before the description of the preferred embodiments, a prior art LCD apparatus will be explained with reference to FIGS. 1, 2 and 3.

Figure 1:
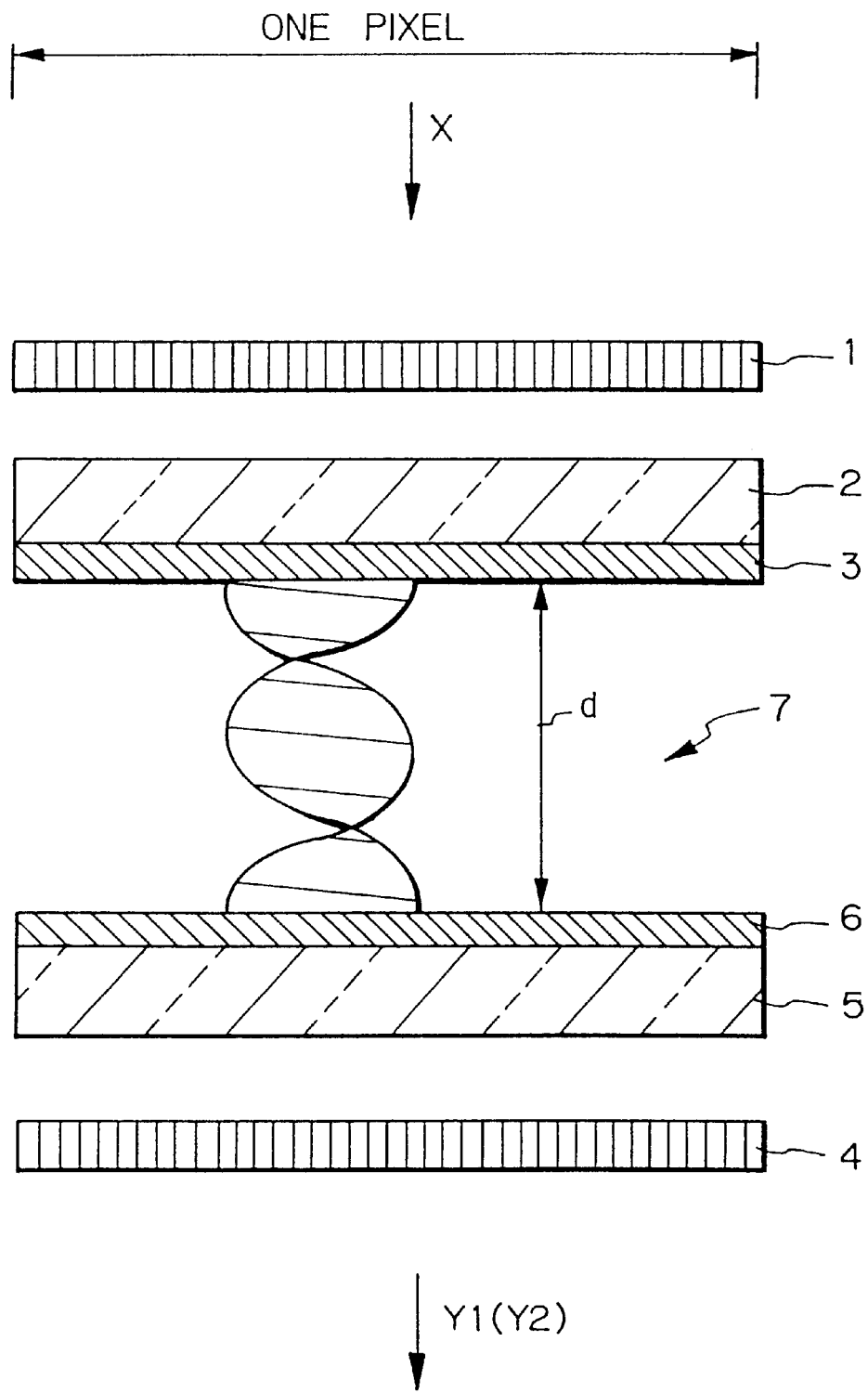
FIG. 1 is a cross-sectional view illustrating a prior art transmission-type TN-mode LCD apparatus.

In FIG. 1, which is a cross-sectional view illustrating a prior art transmission-type TN-mode LCD apparatus, reference numeral 1 designates a polarization plate for passing the frequency component of an incoming light X in a specified direction. Also, reference numeral 2 designates a transparent substrate on which a transparent electrode 3 made of indium tin oxide (ITO) is coated. Similarly, reference numeral 4 designates a polarization plate for passing an outgoing light having a frequency component in a specified direction. Also, reference numeral 5 designates a transparent substrate on which a transparent electrode 6 made of ITO is coated. Further, a liquid crystal layer 7 is provided between the transparent electrodes 3 and 6 with a gap d therebetween. In this case, the orientation of liquid crystal molecules in the liquid crystal layer 7 is twisted.

The operation of the apparatus of FIG. 1 is explained below;

First, assume that no voltage is applied between the transparent electrodes 3 and 6. The incident light X as well as natural light is converted by the polarization plate 1 into a linearly polarized light. Then, this light penerates the transparent substrate 2 and the transparent electrode 3, and is incident to the liquid crystal layer 7. In the liquid crystal layer 7, while the plane of polarization of the incident light is changed by the double refraction characteristics of the liquid crystal layer 7, the light reaches the transparent electrode 6. Then, the light penerates the transparent electrode 6 and the transparent substrate 5. As a result, only the frequency component of light in the specified direction passes through the polarization plate 4, thus obtaining an outgoing light Y1. This is called a first optical state.

Next, assume that a voltage is applied between the transparent electrodes 3 and 6. In this case, the orientation of the liquid crystal molecules in the liquid crystal layer 7 is changed due to the anistropic dielectric characteristics thereof in accordance with the electric field between the transparent electrodes 3 and 6. As a result, the plane of polarization of the light which has reached the transparent electrode 6 is different from that where no voltage is applied between the transparent electrodes 3 and 6. As a result, an outgoing light Y2 different from the outgoing light Y1 is obtained. This is called a second optical state.

Thus, an optical switching between the first optical state and the second optical state is possible depending on whether or not a voltage is applied between the transparent electrodes 3 and 6.

Generally, when the twisted angle of liquid crystal molecules is smaller than a definite value around 270°, the tilt angle of liquid crystal molecules has a linear relationship to the voltage applied between the transparent electrodes 3 and 6. On the other hand, when the twisted angle of liquid crystal molecules is larger than the above-mentioned value, the tilt angle of liquid crystal molecules has an S-shaped relationship to the voltage applied between the transparent electrodes 3 and 6. Therefore, the transient orientation state of liquid crystal molecules during a rising voltage is different from that during a falling voltage. As a result, when an intermediate voltage between a high voltage and a low voltage is applied between the transparent electrodes 3 and 6, there are two orientation states of liquid crystal molecules mixed within one pixel. This can be observed as an orientation defect called a finger texture as shown in FIG. 2. Thus, a large hysteresis is generated in the voltage-to-light transmittance characteristics as shown in FIG. 3, so that a gray scale display is impossible.

In order to realize a small hysteresis, an initial orientation operation such as a rubbing operation is not carried out, so that the orientation of crystal liquid molecules is in an amorphous state (see T. Sugiyama et al., "A Reflective a-N*GH-LCD and Its Ergonomic Characterization and Optimization", SID 96 Digest, pp. 35–38, 1996). In this case, however, the orientation of liquid crystal molecules is easily caused by the injection of liquid crystal into the space between the transparent electrodes 3 and 6, and in addition, it is difficult to supervise the temperature of liquid crystal during the injection thereof.

Figure 4:
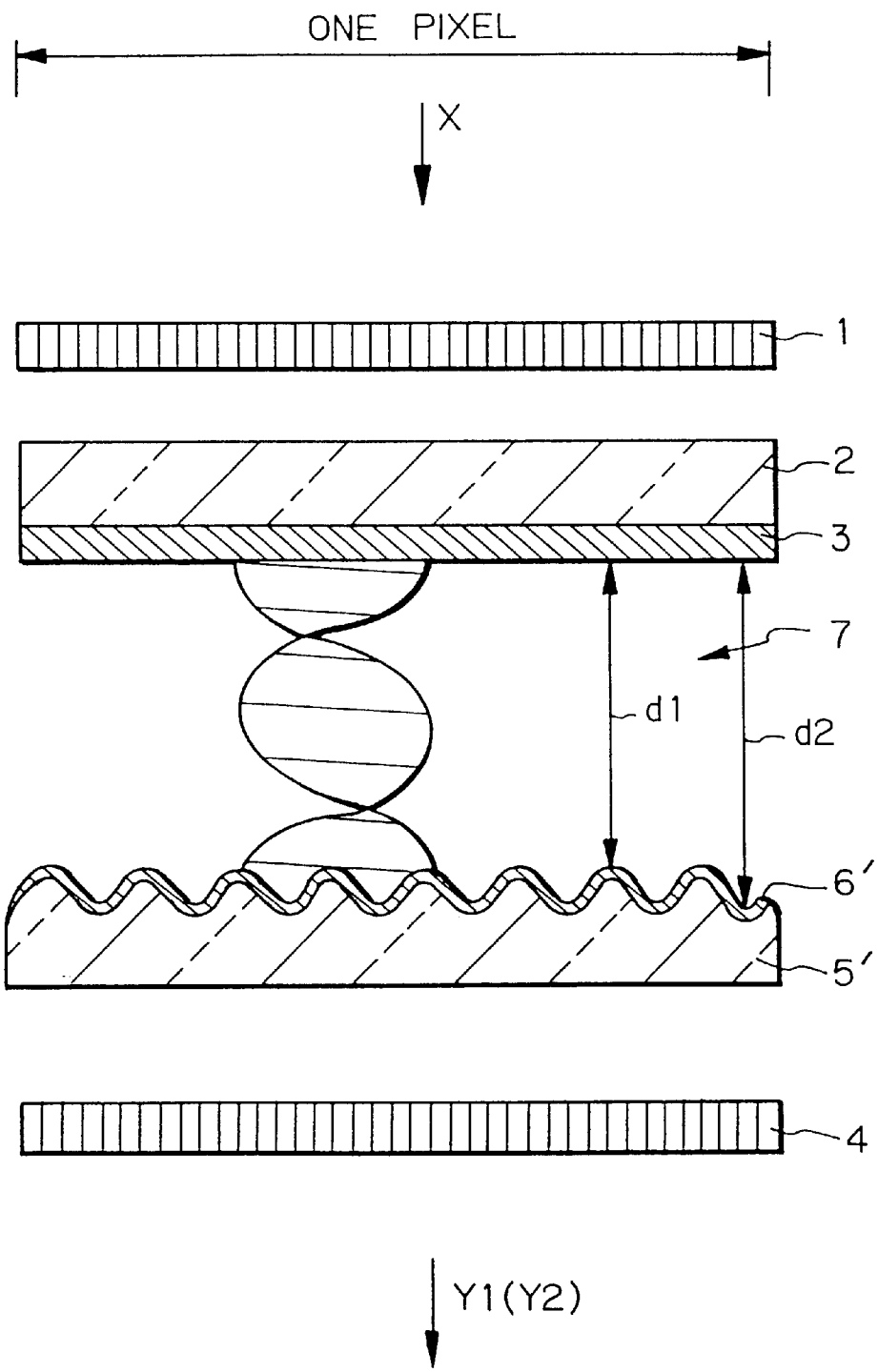
FIG. 4 is a cross-sectional view illustrating a first embodiment of the TN-mode LCD apparatus according to the present invention.

In FIG. 4, which illustrates a first embodiment of the present invention, the transparent substrate 5 and the transparent electrode 6 of FIG. 1 are modified into a transparent substrate 5' and a transparent electrode 6', respectively. That is, the surface of the transparent substrate 5' is made uneven by using an etching process, a sand blasting process or a polishing process. Since the transparent electrode 6' made of ITO is formed on the uneven transparent substrate 5' by an evaporation process, a sputtering process or a coating process, the surface of the transparent electrode 6' is made uneven. Also, the twisted angle of liquid crystal molecules between the transparent electrodes 3 and 6' is about 270° to 450°

Also, in FIG. 4, the incident light X as well as natural light is converted by the polarization plate 1 into a linearly polarized light. Then, this light penerates the transparent substrate 2 and the transparent electrode 3 and is incident to the liquid crystal layer 7. In the liquid crystal layer 7, while the plane of polarization of the incident light is changed by the double refraction characteristics of the liquid crystal layer 7, the light reaches the transparent electrode 6'. Then, the light penerates the transparent electrode 6' and the transparent substrate 5'. As a result, only the frequency component of light in the specified direction passes through the polarization plate 4, thus obtaining an outgoing light Y1 or Y2.

Figure 5:
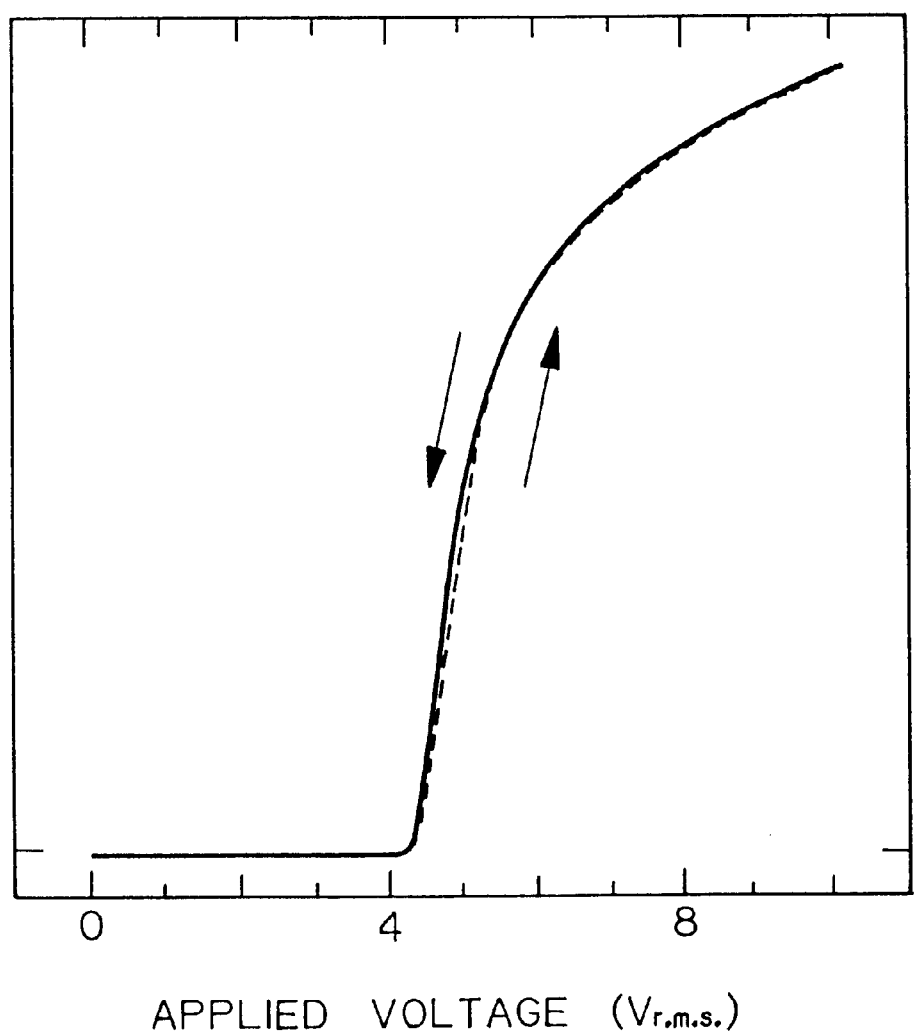
FIG. 5 is a graph showing the voltage-to-light transmittance characteristics of the liquid crystal layer of FIG. 4.

In the liquid crystal layer 7, a gap between the transparent electrodes 3 and 6' is changed from d1 to d2 within one pixel, so that an electric field applied to the liquid crystal layer 7 is changed within one pixel in accordance with the gap. As a result, the electric field is fluctuated within one pixel, so that a threshold voltage and a saturation voltage of liquid crystal are changed microscopically within one pixel. Therefore, although a large hysteresis is generated microscopically within one pixel, in other words, a large number of different threshold voltages are generated microscopically within one pixel, the different threshold voltages are summed within one pixel, so that the hysteresis of liquid crystal in the entire one pixel is made small as shown in FIG. 5. In addition, the transition curve of the voltage-to-light transmittance characteristics is relatively sloped, so that the gray scale display characteristics can be improved.

Figure 6:
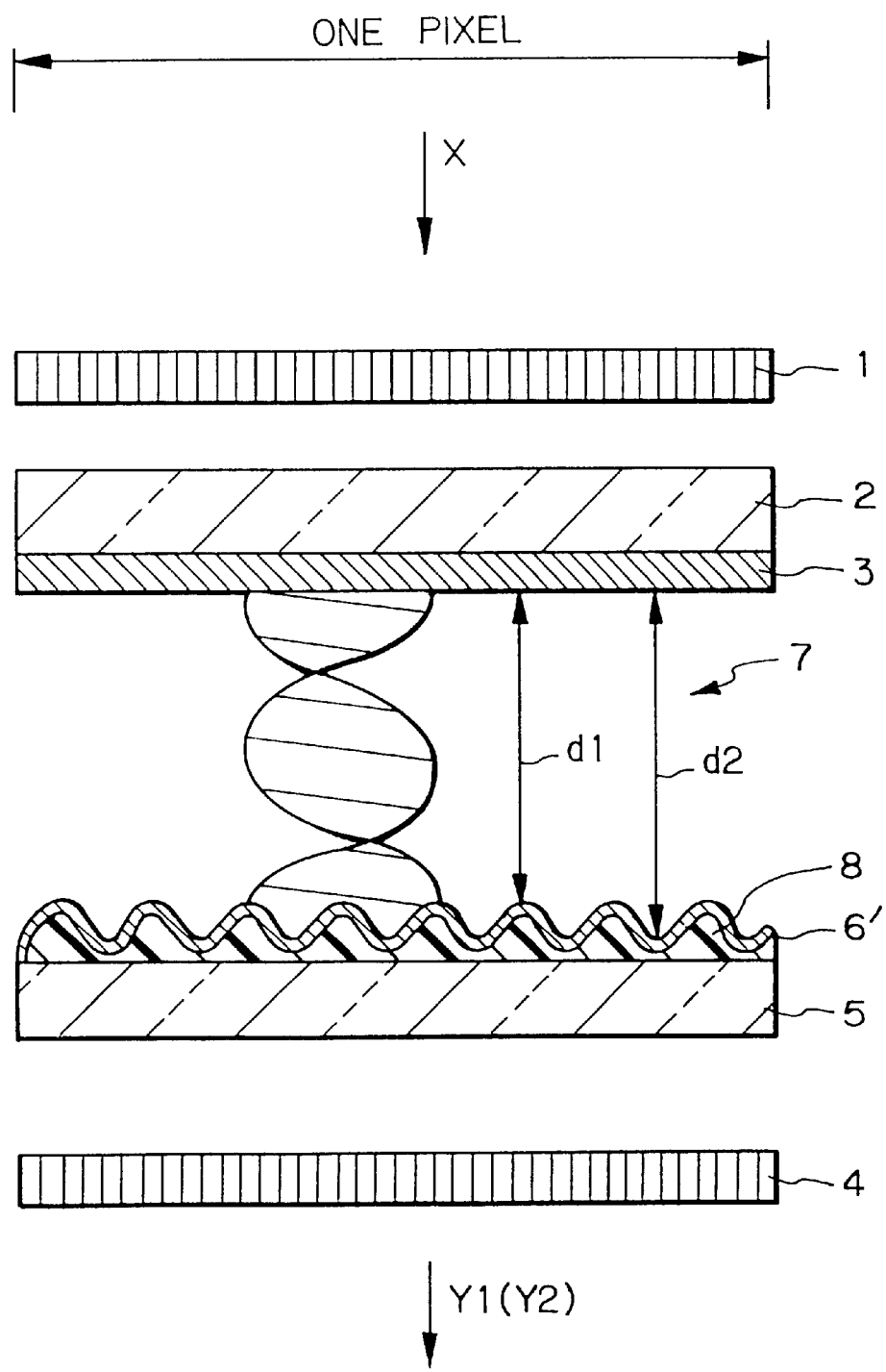
FIG. 6 is a cross-sectional view illustrating a second embodiment of the TN-mode LCD apparatus according to the present invention.

In FIG. 6, which illustrates a second embodiment of the present invention, a layer 8 having an uneven surface is formed on the transparent substrate 5 of FIG. 1, and a transparent electrode 6' made of ITO is formed on the layer 8. Since the surface of the layer 8 is uneven, the surface of the transparent electrode 6' is also uneven. Thus, in the same way as in the first embodiment, the hysteresis of liquid crystal on the entire one pixel is made small, thus improving the gray scale display characteristics. Note that the layer 8 is made of inorganic material or organic material such as polyimide or acrylic resin.

Figure 7:
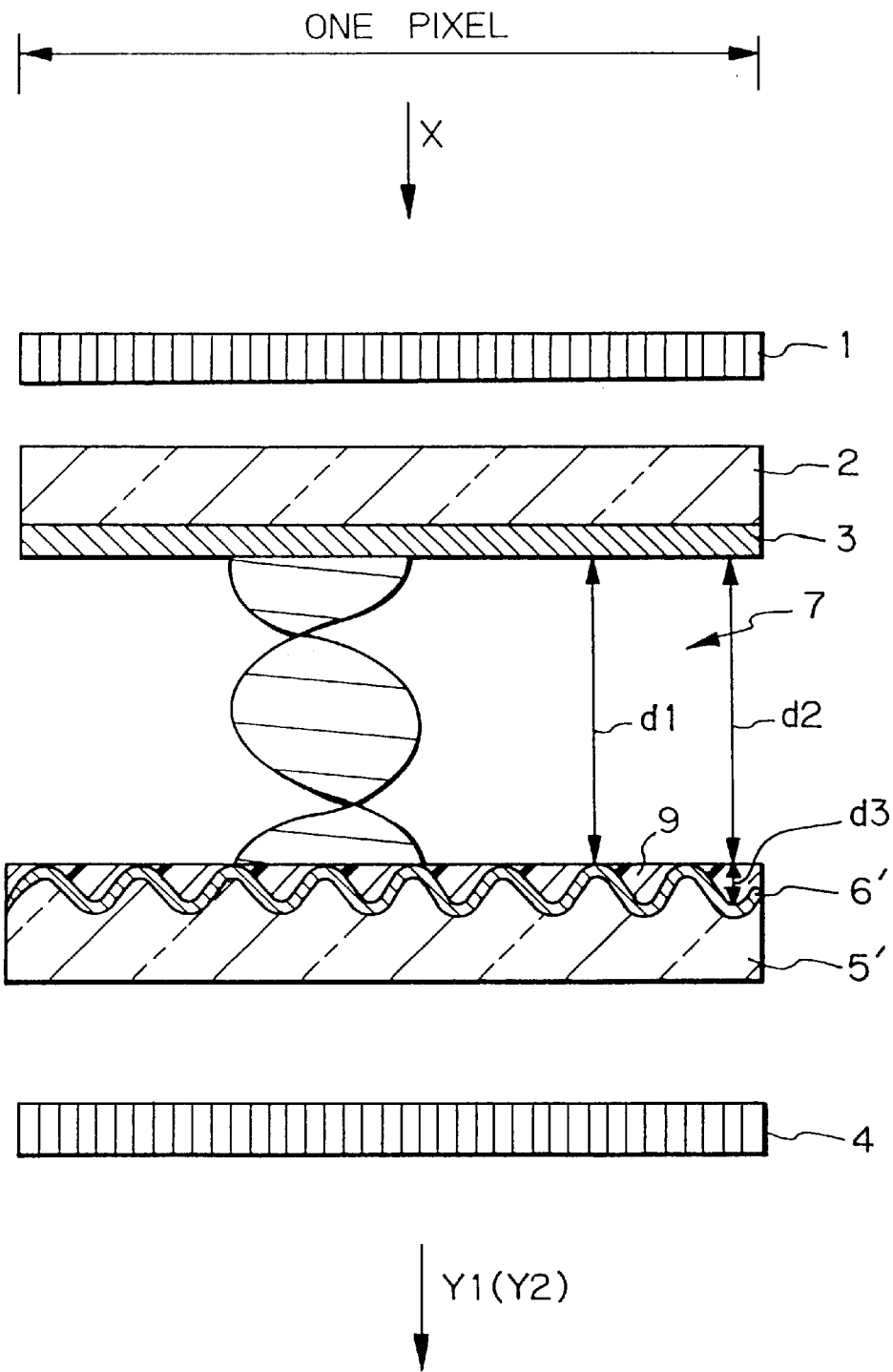
FIG. 7 is a cross-sectional view illustrating a third embodiment of the TN-mode LCD apparatus according to the present invention.

In FIG. 7, which illustrates a third embodiment of the present invention, a leveling layer 9 is buried in the recess portions of the transparent electrode 6' of FIG. 4. In this case, the leveling layer 9 is made of organic or inorganic material having a permittivity equal to or smaller than that of the liquid crystal layer 7. Thus, the thickness of the liquid crystal layer 7 is uniform regardless of the unevenness of the transparent electrode 6', which suppresses the fluctuation of the orientation of liquid crystal molecules. This contributes to the improvement of the display characteristics.

Also, in FIG. 7, at the recess portions of the transparent electrode 6', the voltage applied between the transparent electrodes 3 and 6' is divided by the liquid crystal layer 7 and the leveling layer 9, thus substantially reducing the voltage applied to the liquid crystal layer 7 on the recess portions of the transparent electrode 6'. As a result, the electric field is fluctuated within one pixel. Thus, in the same way as in the first embodiment, the hysteresis of liquid crystal on the entire one pixel is made small, thus improving the gray scale display characteristics.

Figure 8:
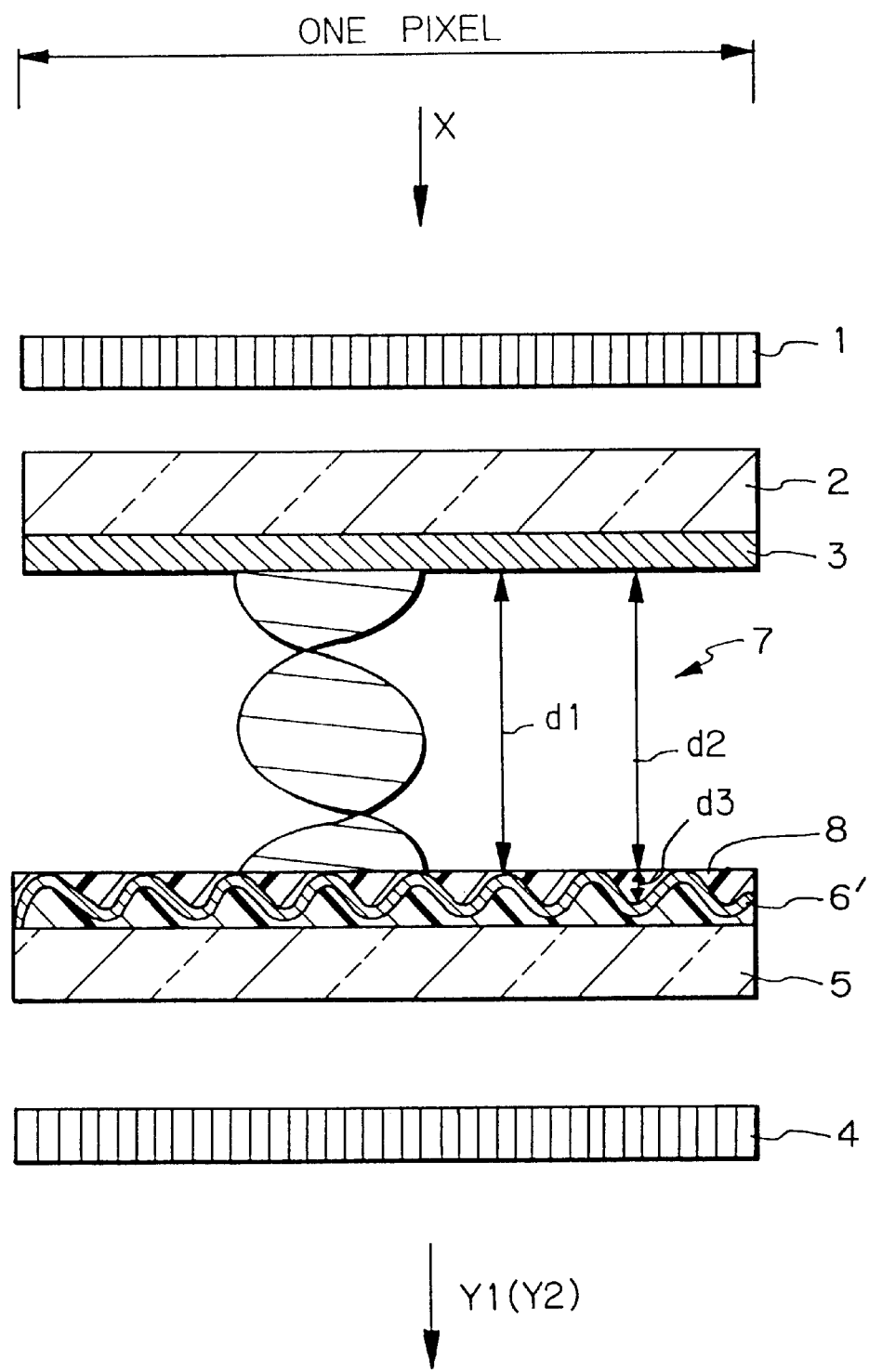
FIG. 8 is a cross-sectional view illustrating a fourth embodiment of the TN-mode LCD apparatus according to the present invention.

In FIG. 8, which illustrates a fourth embodiment of the present invention, a leveling layer 9 is buried in the recess portions of the transparent electrode 6' of FIG. 6. Also, in this case, the leveling layer 9 is made of organic or inorganic material having a permittivity equal to or smaller than that of the liquid crystal layer 7. Thus, the thickness of the liquid crystal layer 7 is uniform regardless of the unevenness of the transparent electrode 6', which suppresses the fluctuation of the orientation of liquid crystal molecules. This contributes to the improvement of the display characteristics.

Also, in FIG. 8, at the recess portions of the transparent electrode 6', the voltage applied between the transparent electrodes 3 and 6' is divided by the liquid crystal layer 7 and the leveling layer 9, thus substantially reducing the voltage applied to the liquid crystal layer 7 on the recess portions of the transparent electrode 6'. As a result, the electric field is fluctuated within one pixel. Thus, in the same way as in the second embodiment, the hysteresis of liquid crystal on the entire one pixel is made small, thus improving the gray scale display characteristics.

Figure 9:
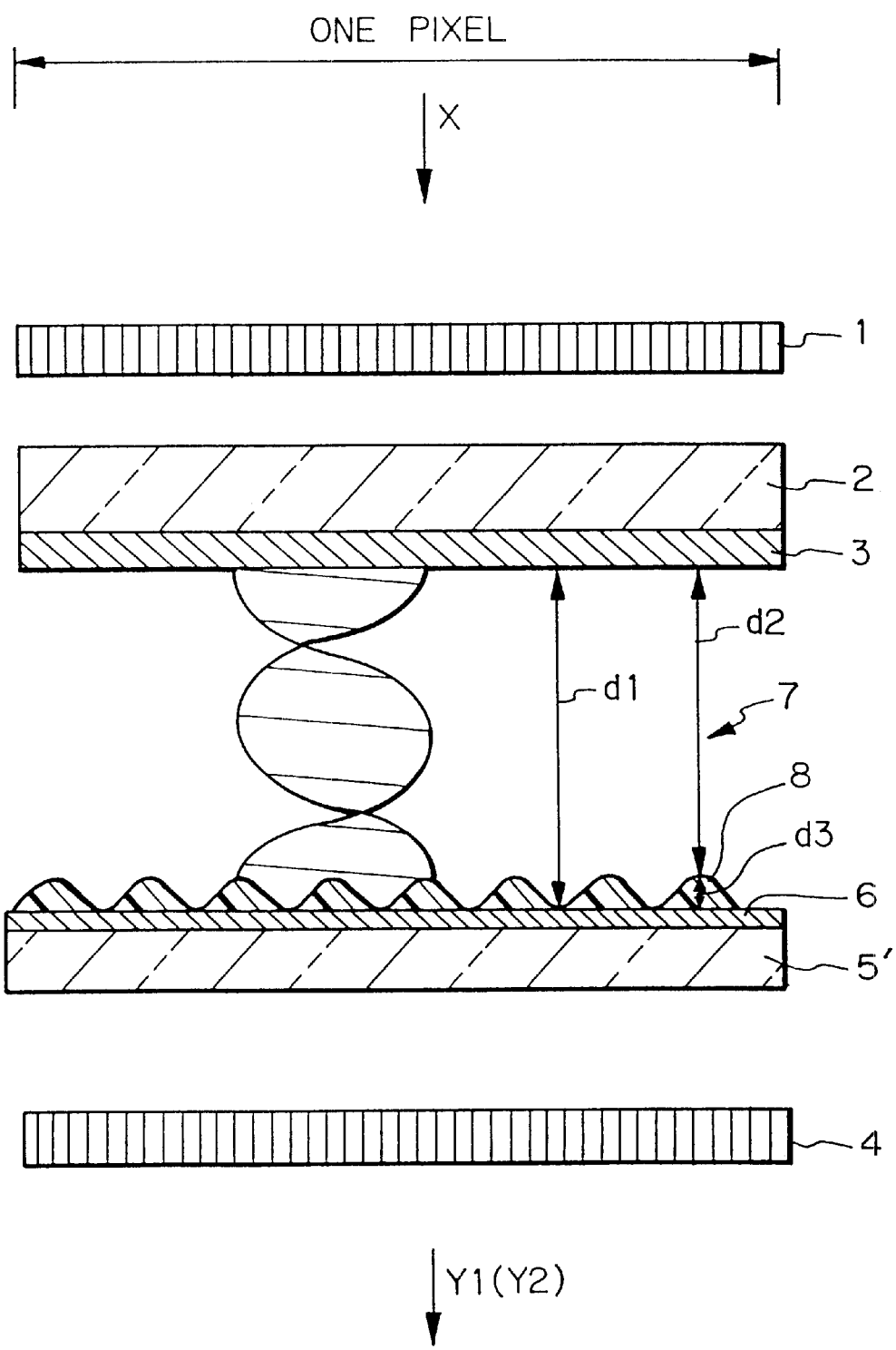
FIG. 9 is a cross-sectional view illustrating a fifth embodiment of the TN-mode LCD apparatus according to the present invention.
Figure 10:
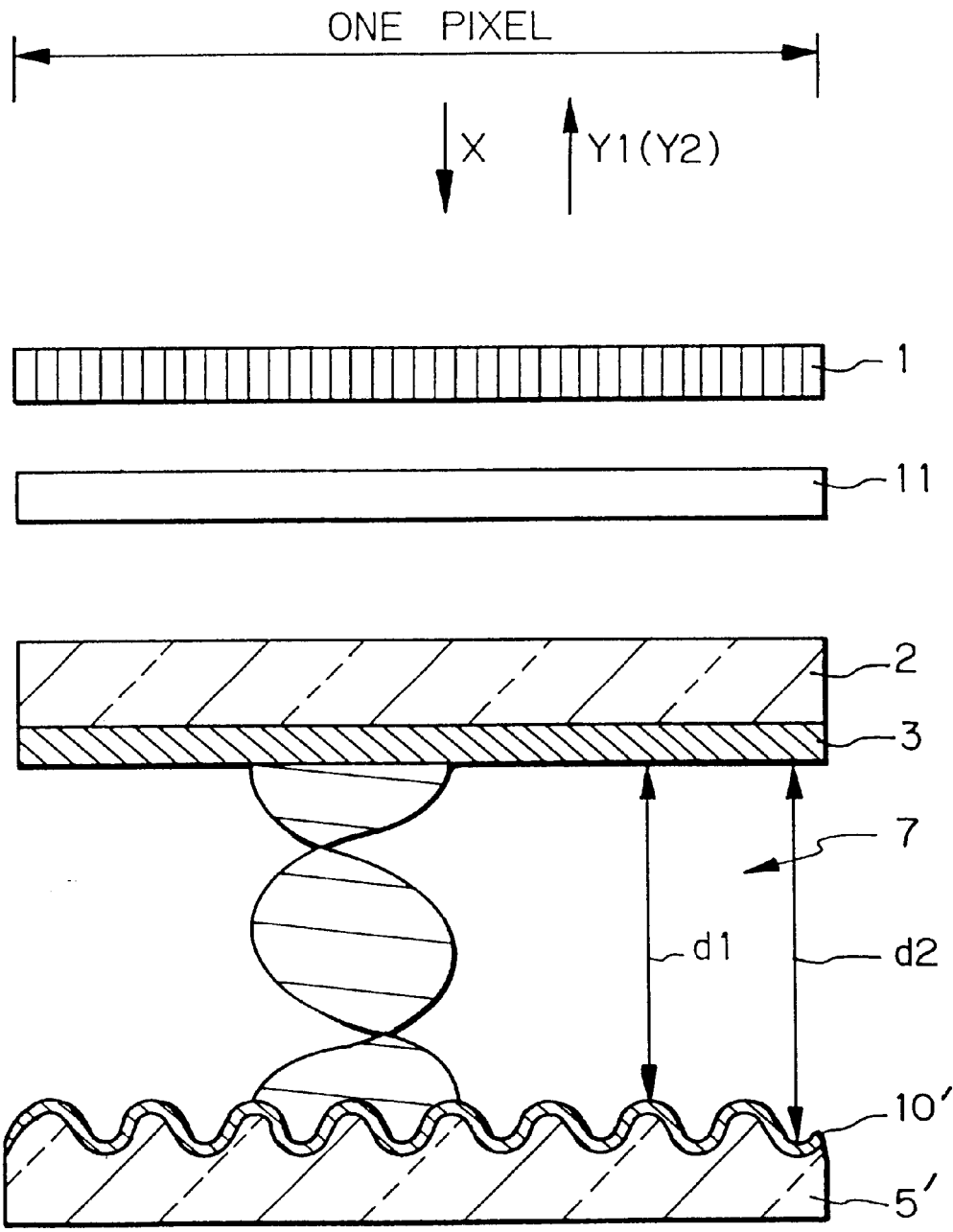
FIGS. 10, 11, 12, 13 and 14 are cross-sectional views illustrating modifications of the apparatuses of FIGS. 4, 6, 7, 8 and 9, respectively.
Figure 11:
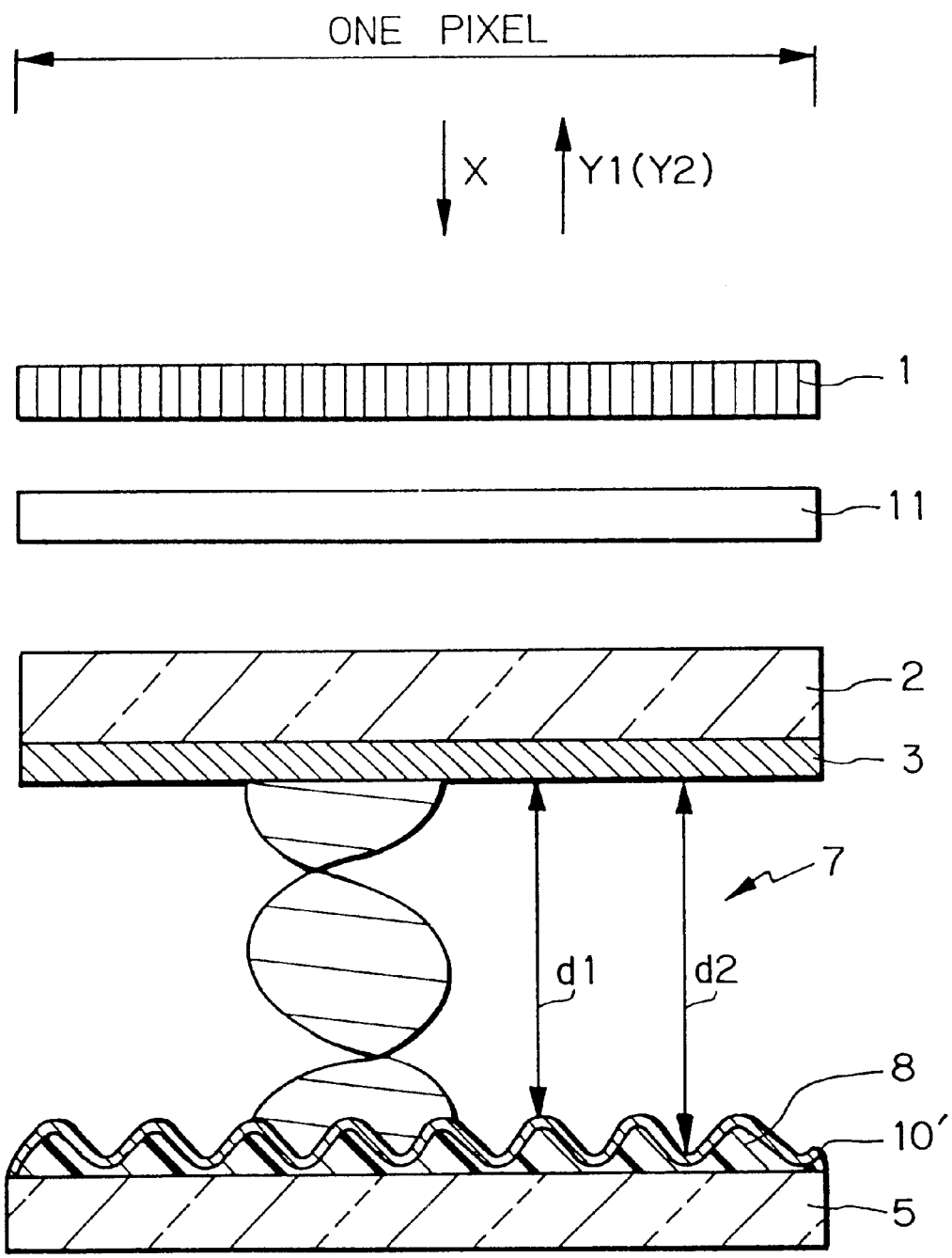
Figure 12:
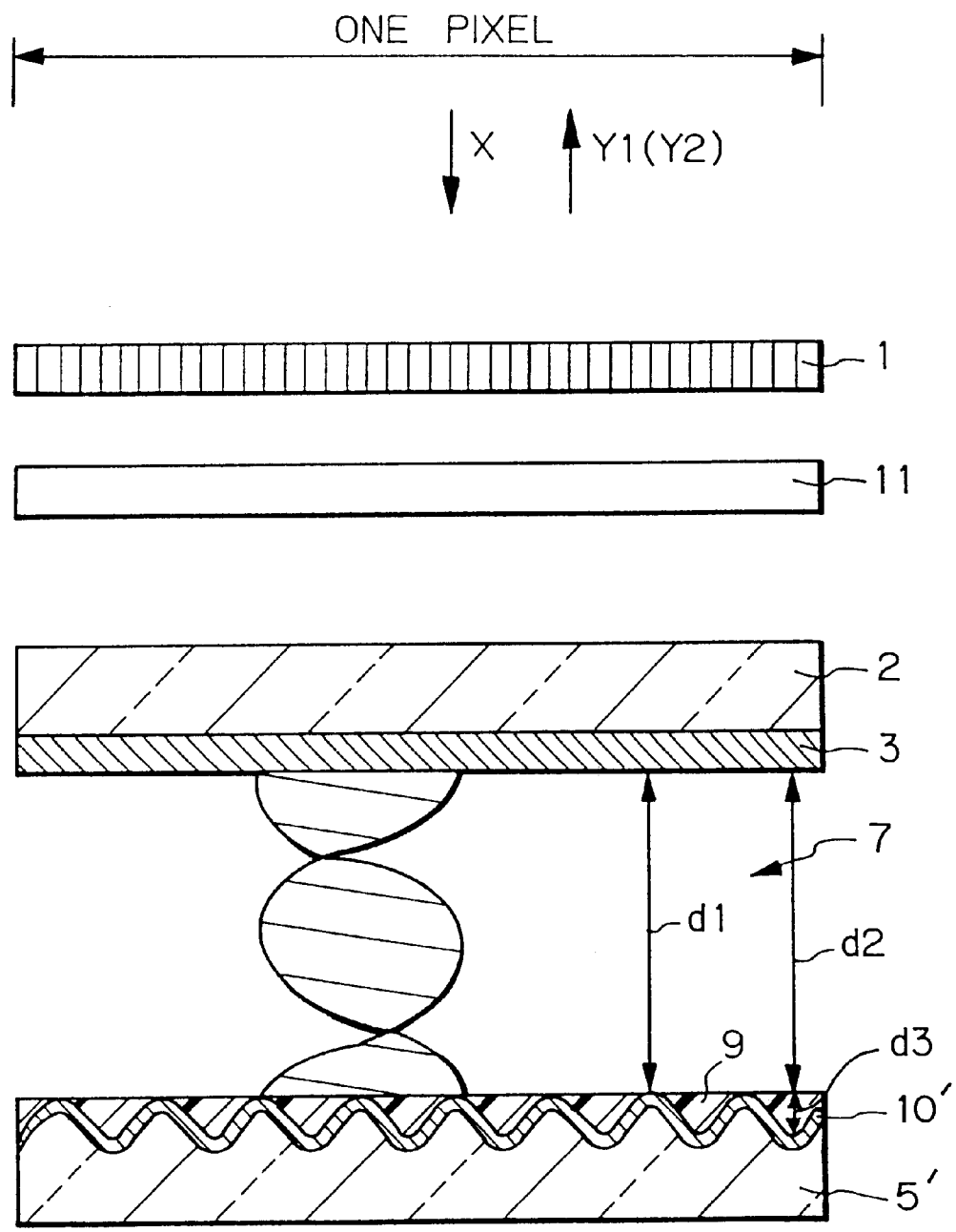
Figure 13:
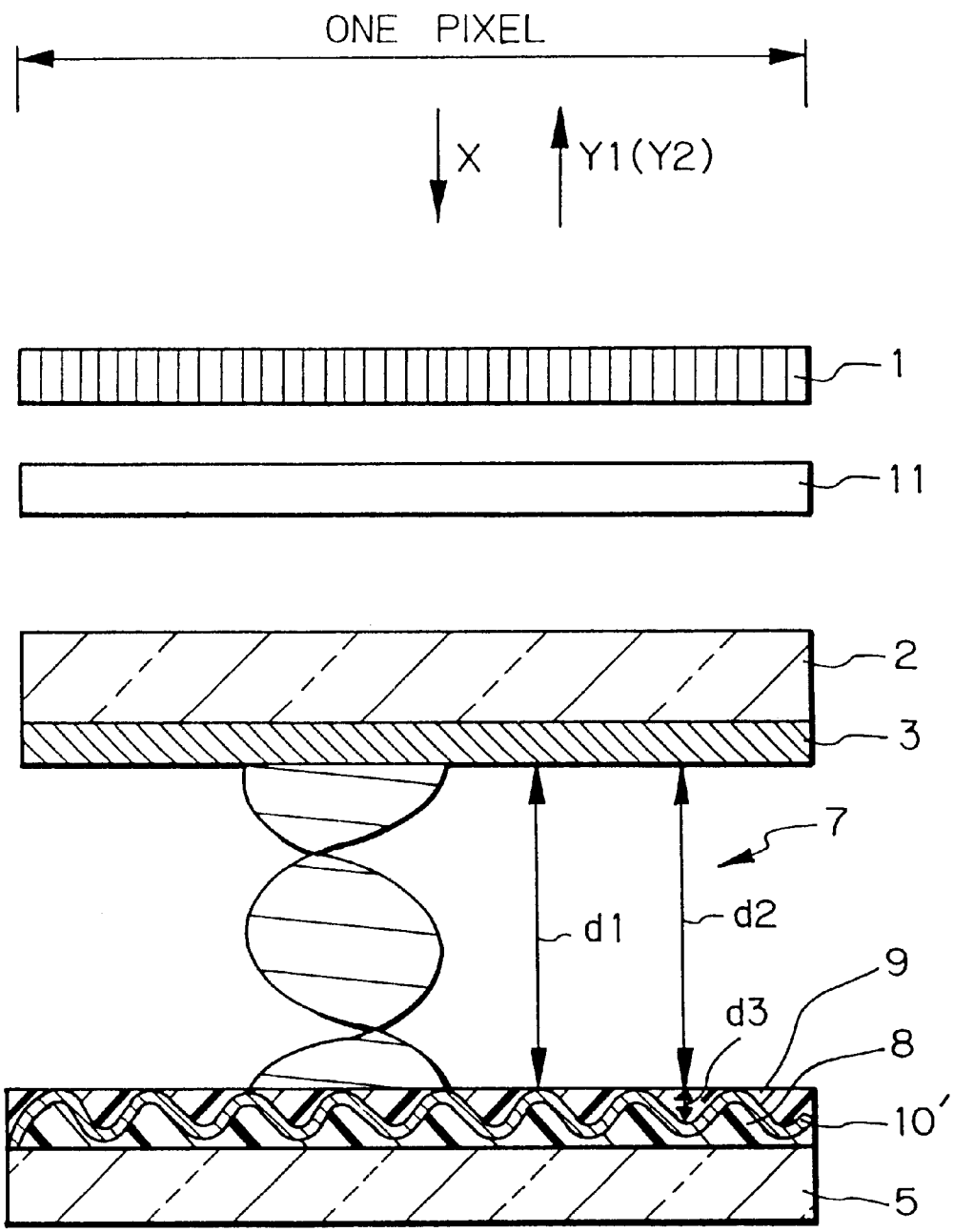
Figure 14:
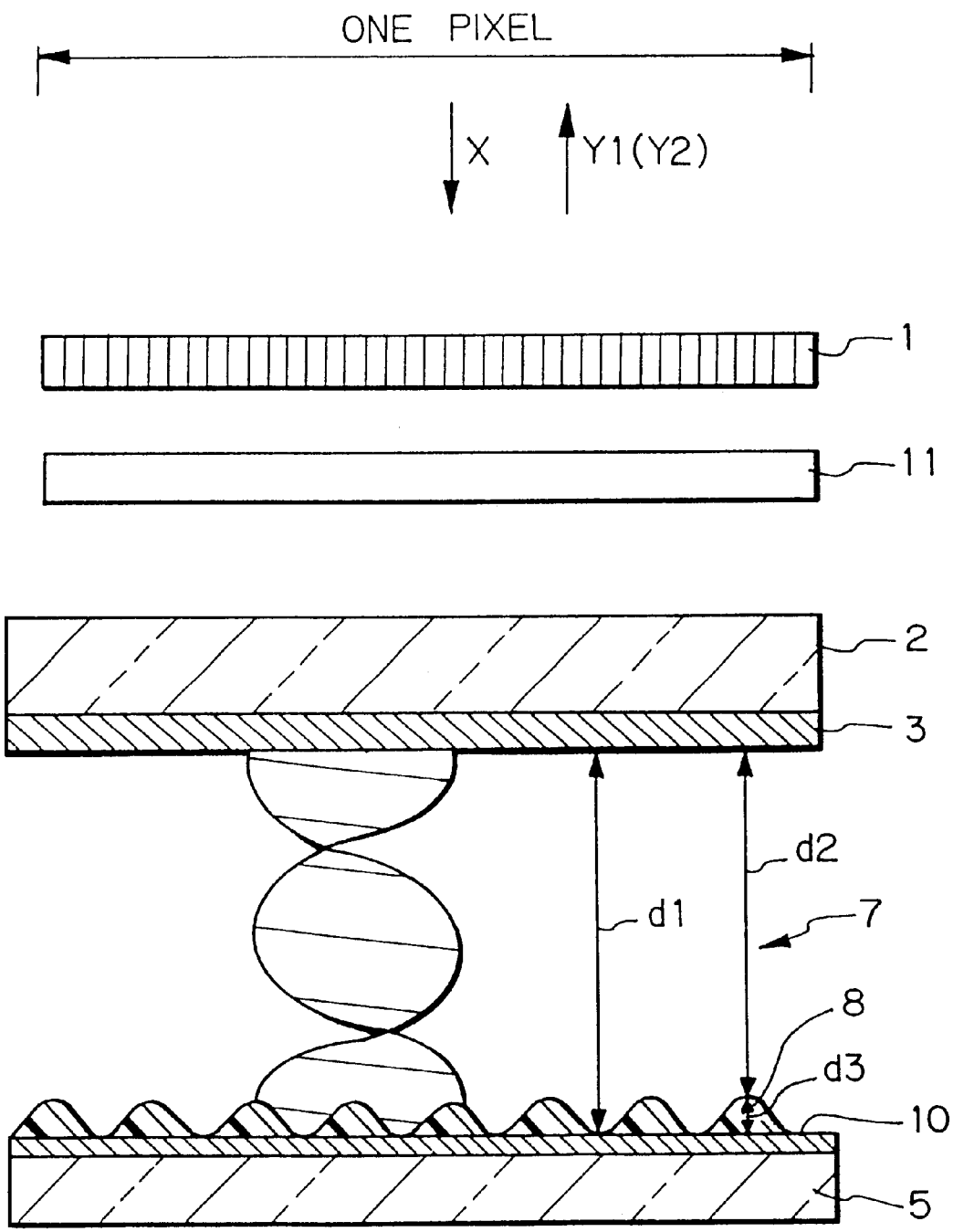

In FIG. 9, which illustrates a fifth embodiment of the present invention, a layer 8 having an uneven surface is formed on the transparent electrode 6 of FIG. 1. In this case, the layer 8 is made of organic or inorganic material having a permittivity equal to or smaller than that of the liquid crystal layer 7. As the recess portions of the layer 8, the voltage applied between the transparent electrodes 3 and 6 per se is applied the liquid crystal layer 7. On the other hand, at the protrusion portions of the layer, the voltage applied between the transparent electrodes 3 and 6' is divided by the liquid crystal layer 7 and the layer 8, thus substantially reducing the voltage applied to the liquid crystal layer 7 on the protrusion portions of the layer 8. As a result, the electric field is fluctuated within one pixel. Thus, in the same way as in the first embodiment, the hysteresis of liquid crystal on the entire one pixel is made small, thus improving the gray scale display characteristics.

In FIGS. 10, 11, 12, 13 and 14, the apparatuses of FIGS. 4, 6, 7, 8 and 9, respectively, are applied to reflection-type TN-mode LCD apparatuses, which do not require back lights. That is, a reflective electrode 10' or 10 made of aluminum or the like is provided instead of the transparent electrode 6 or 6' of FIGS. 4, 6, 7, 8 and 9. Also, a phase difference compensation plate 11 is inserted between the polarization plate 1 and the transparent substrate 2 of FIGS. 4, 6, 7, 8 and 9. Further, the polarization plate 4 of FIGS. 4, 6, 7, 8 and 9 is not provided. The transparent substrate 5 or 5' can be opaque, i.e., made of metal, polymer or ceramic.

Note that the reflective electrode 10 or 10' can be formed by a sputtering process.

In FIGS. 10, 11, 12, 13 and 14, an incident light X as well as natural light is converted by the polarization plate 1 into a linearly polarized light. Then, this light penetrates the phase difference compensation plate 11, the transparent substrate 2 and the transparent electrode 3, and is incident to the liquid crystal layer 7. In the liquid crystal layer 7, while the plane of polarization of the incident light is changed by the double refraction characteristics of the liquid crystal layer 7, the light reaches the reflective electrode 10 or 10'.

On the other hand, light reflected from the reflective electrode 10 or 10' is again incident to the liquid crystal layer 7. In the liquid crystal layer 7, while the plane of polarization of the incident light is changed by the double refraction characteristics of the liquid crystal layer 7, the light reaches the transparent electrode 3. Then, the light again penetrates the transparent electrode 3, the transparent substrate 2 and the phase difference compensation plate 11. As a result, only the frequency component of light in a specified direction passes through the polarization plate 1, thus obtaining an outgoing light Y1 or Y2.

In FIGS. 10, 11, 12, 13 and 14, in the same way as in the first, second, third, fourth and fifth embodiments, the hysteresis of liquid crystal molecules is made small, thus improving the gray scale display characteristics.

Figure 15:
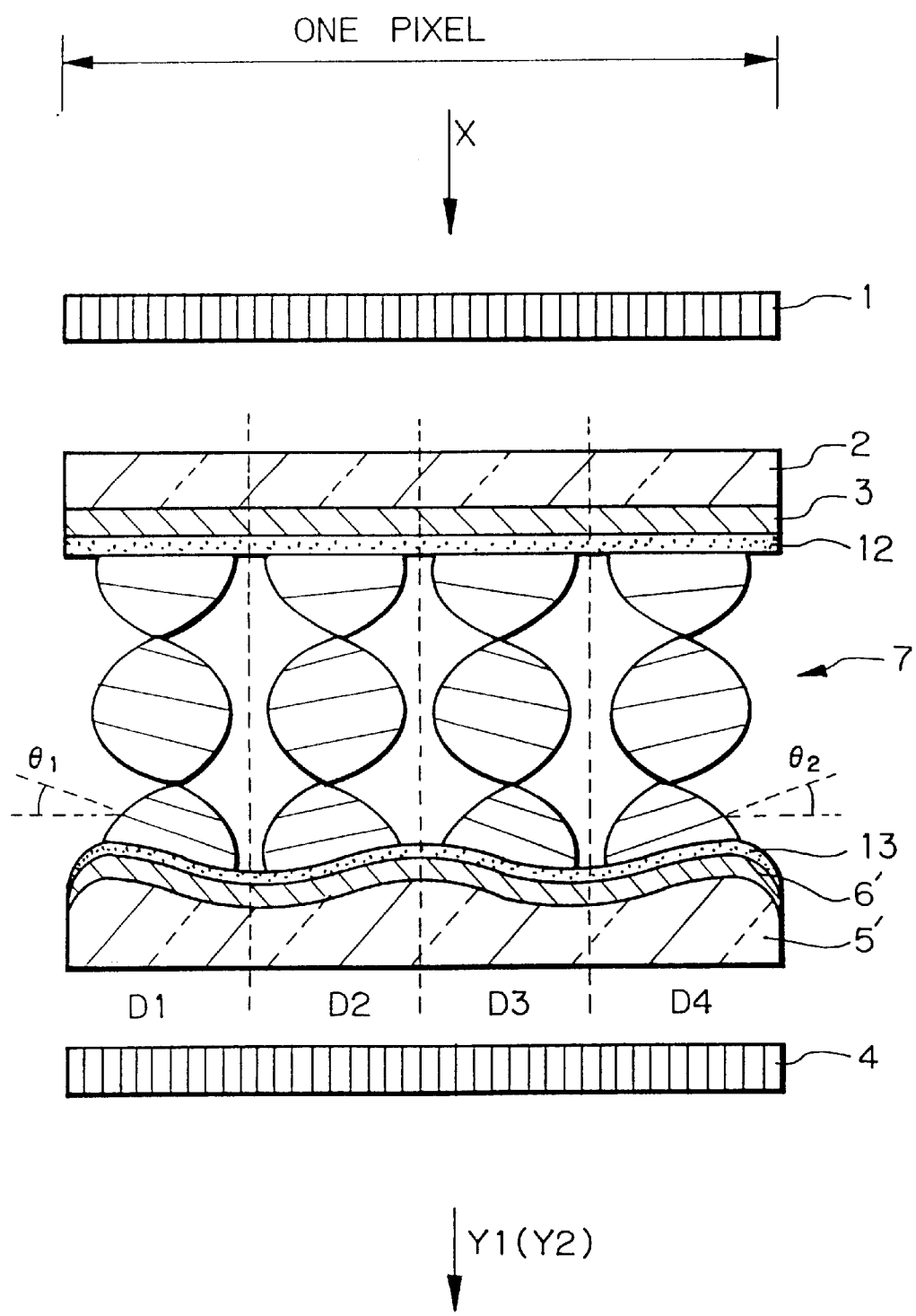
FIG. 15 is a cross-sectional view illustrating a fifth embodiment of the TN-mode LCD apparatus according to the present invention.

In FIG. 15, which illustrates a sixth embodiment of the present invention, oriented layers 12 and 13 are formed on the transparent electrodes 3 and 6', respectively, of FIG. 4. Rubbing processes are performed on the oriented layers 12 and 13, to give an initial orientation to the liquid crystal layer 7. This suppresses the fluctuation of orientation of liquid crystal molecules caused by the injection of liquid crystal between the transparent substrates 2 and 5'.

Figure 16:
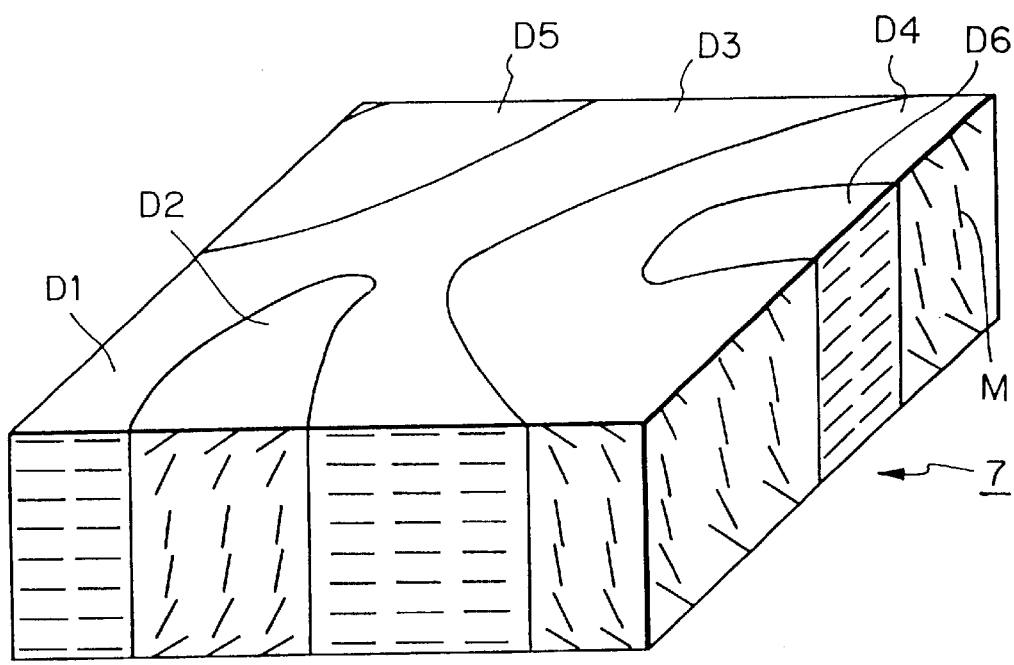
FIG. 16 is a perspective view of the liquid crystal layer of FIG. 15.

In addition, in FIG. 15, since the surface of the transparent substrate 5' is uneven, so that the surface of the oriented layer 13 is uneven, the pretilt angle of liquid crystal molecules is dependent upon the uneven surface of the oriented layer 13. For example, the pretilt angle of a domain D1 is indicated by $\theta_1$, and the pretilt angle of a domain D4 is indicated by $\theta_2$. Therefore, there is discontinuity of the pretilt angle among the domains D1, D2, . . . , which are independent of each other, as illustrated in FIG. 16, where reference M designates a liquid crystal molecule. Since the threshold voltage and saturation voltage of each domain are also dependent upon the pretilt angle, there are many threshold voltages and saturation voltages within one pixel. Therefore, although a large hysteresis is generated microscopically within one pixel, in other words, a large number of different threshold voltages are generated microscopically within one pixel, the different threshold voltages are summed within one pixel, so that the hysteresis of liquid crystal in the entire one pixel is also made small as shown in FIG. 5. In addition, the transition curve of the voltage-to-light transmittance characteristics is relatively sloped, so that the gray scale display characteristics can be improved.

Figure 17:
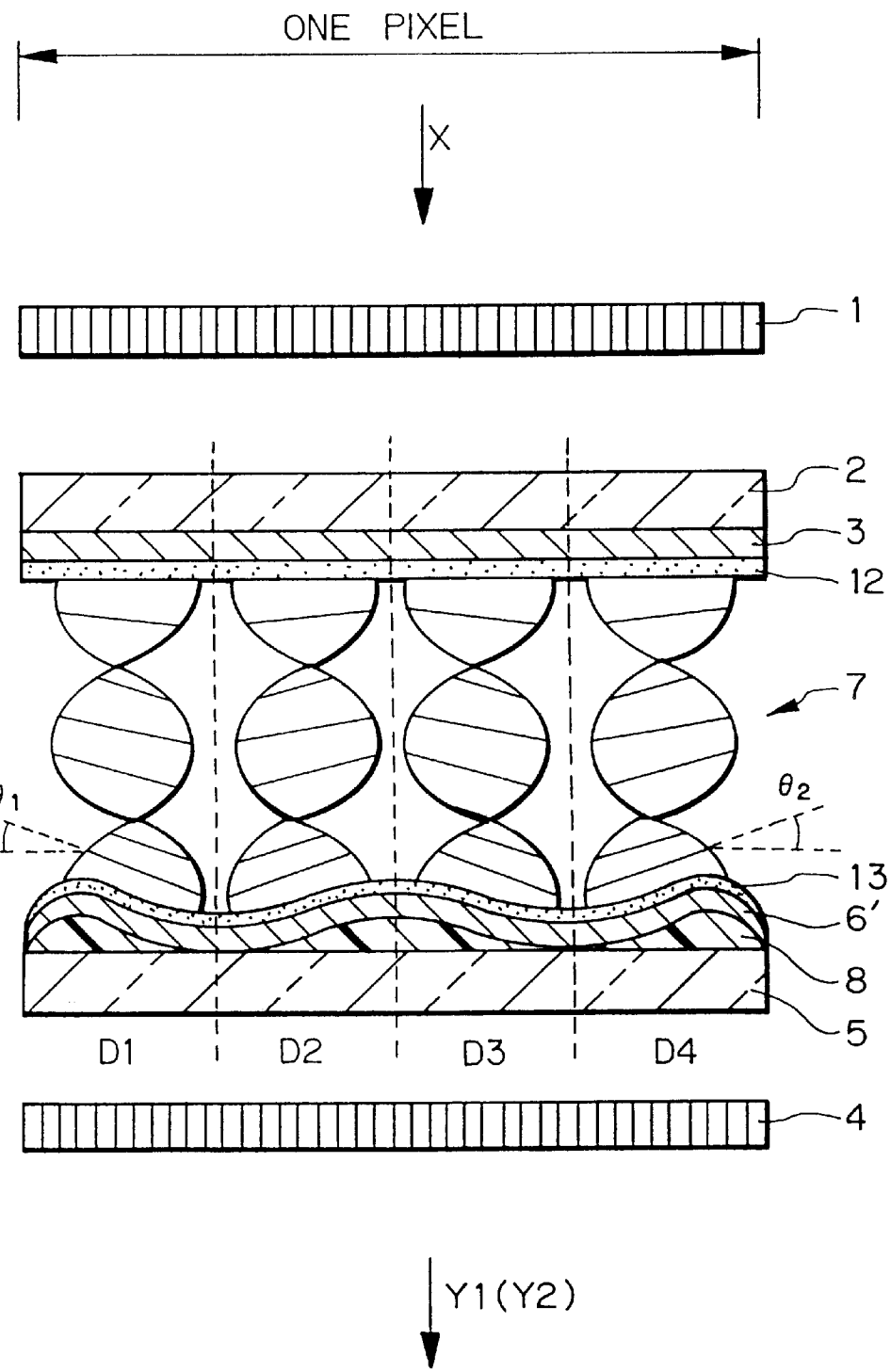
FIG. 17 is a cross-sectional view illustrating a seventh embodiment of the TN-mode LCD apparatus according to the present invention.

In FIG. 17, which illustrates a seventh embodiment of the present invention, in the same way as in the second embodiment, a layer 8 having an uneven surface is formed on the transparent substrate 5 of FIG. 1, and a transparent electrode 6' made of ITO is formed on the layer 8. Since the surface of the layer 8 is uneven, the surface of the transparent electrode 6' is also uneven. Thus, in the same way as in the sixth embodiment, the pretilt angle of liquid crystal molecules is dependent upon the uneven surface of the oriented layer 13. As a result, the hysteresis of liquid crystal on the entire one pixel is made small, thus improving the gray scale display characteristics.

Figure 18:
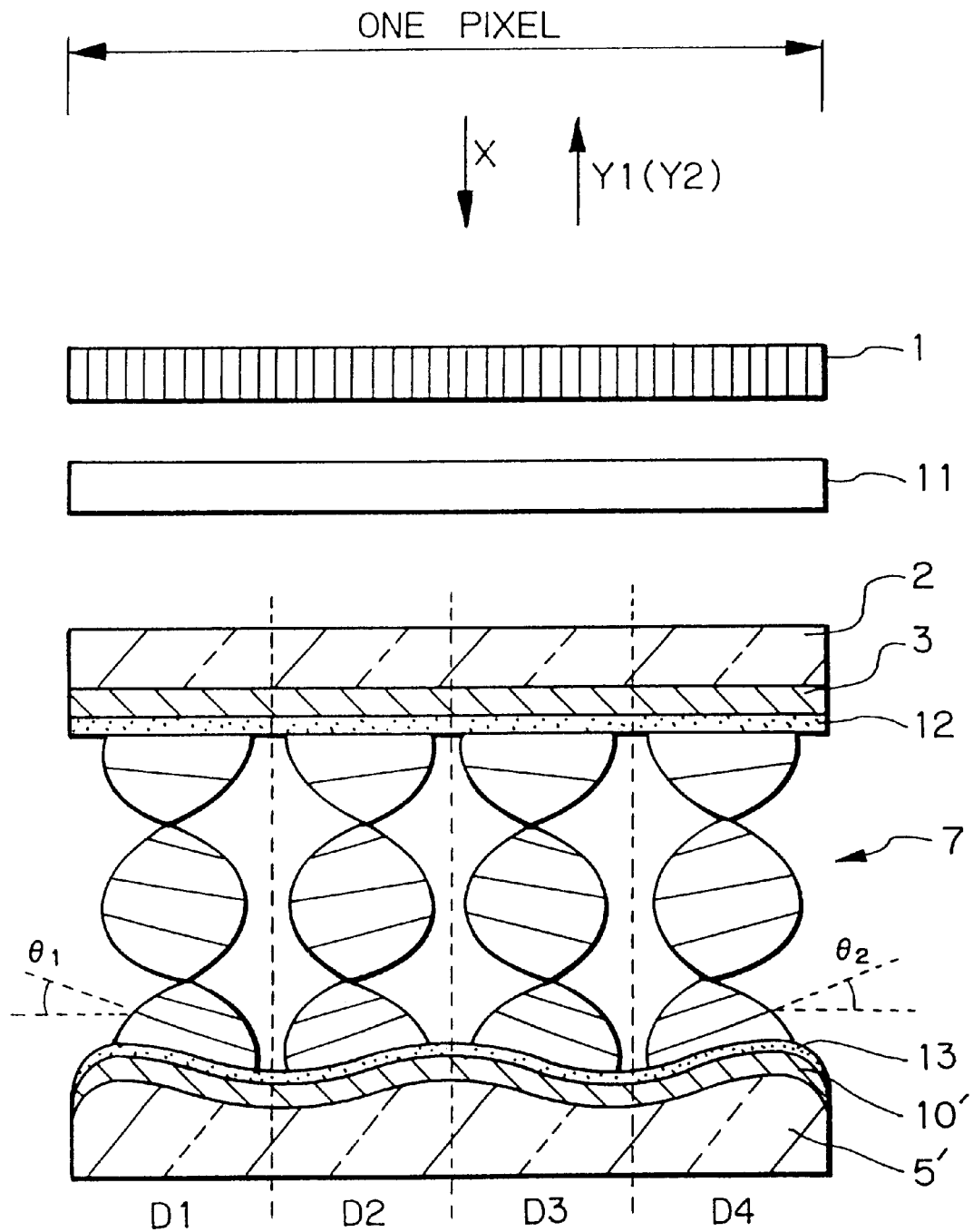
FIGS. 18 and 19 are cross-sectional views illustrating modifications of the apparatuses of FIGS. 15 and 17, respectively.
Figure 19:
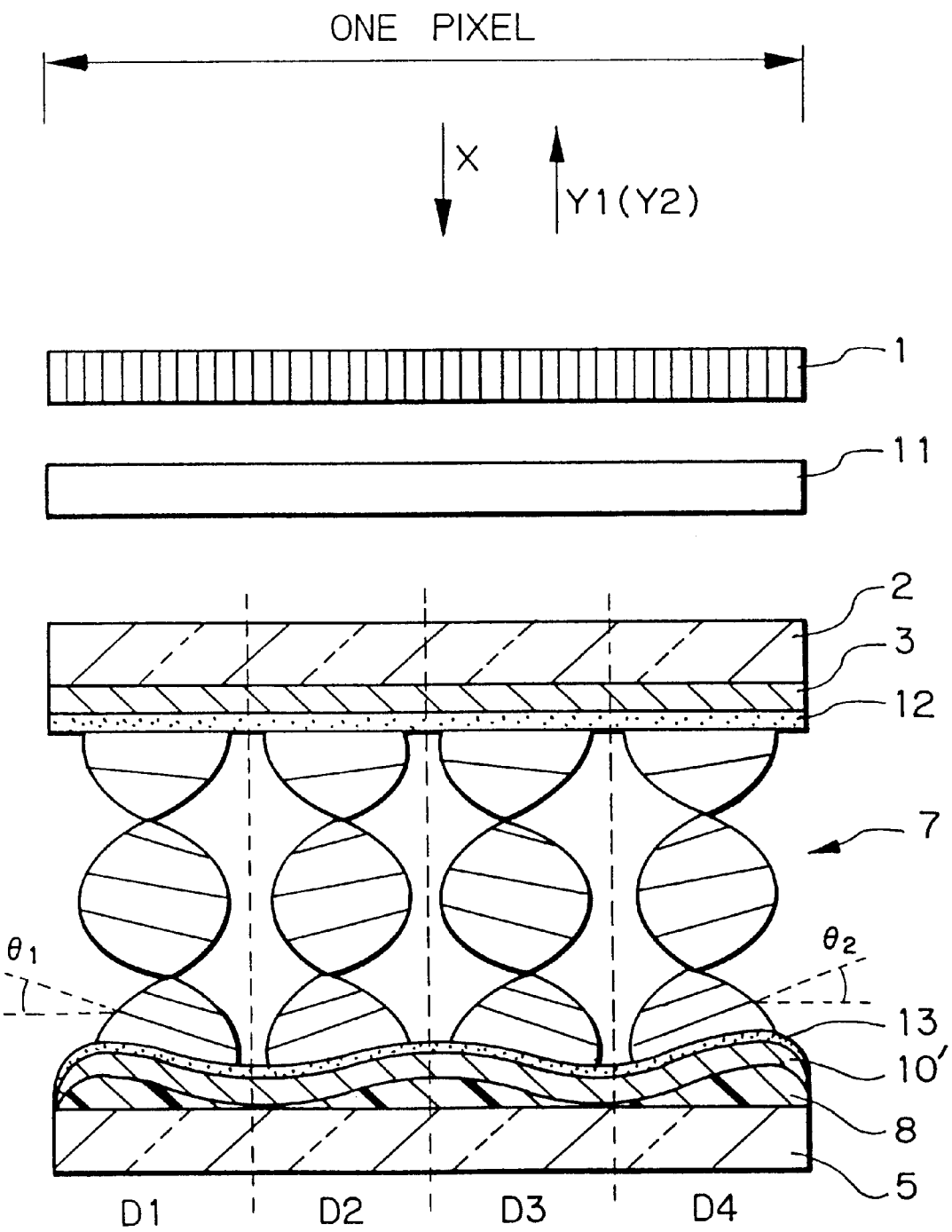

In FIGS. 18 and 19, the apparatuses of FIGS. 15 and 17, respectively, are applied to reflection-type TN-mode LCD apparatuses, which do not require back lights. That is, a reflective electrode 10' made of aluminum or the like is provided instead of the transparent electrode 6' of FIGS. 15 and 17. Also, a phase difference compensation plate 11 is inserted between the polarization plate 1 and the transparent substrate 2 of FIGS. 15 and 17. Further, the polarization plate 4 of FIGS. 15 and 17 is not provided. The transparent substrate 5' can be opaque, i.e., made of metal, polymer or ceramic.

In FIGS. 18 and 19, an incident light X as well as natural light is converted by the polarization plate 1 into a linearly polarized light. Then, this light penetrates the phase difference compensation plate 11, the transparent substrate 2 and the transparent electrode 3, and is incident to the liquid crystal layer 7. In the liquid crystal layer 7, while the plane of polarization of the incident light is changed by the double refraction characteristics of the liquid crystal layer 7, the light reaches the reflective electrode 10'.

On the other hand, light reflected from the reflective electrode 10' is again incident to the liquid crystal layer 7. In the liquid crystal layer 7, while the plane of polarization of the incident light is changed by the double refraction characteristics of the liquid crystal layer 7, the light reaches the transparent electrode 3. Then, the light again penetrates the transparent electrode 3, the transparent substrate 2 and the phase difference compensation plate 11. As a result, only the frequency component of light in a specified direction passes through the polarization plate 1, thus obtaining an outgoing light Y1 or Y2.

In FIGS. 18 and 19, in the same way as in the sixth and seventh embodiments, the hysteresis of liquid crystal molecules is made small, thus improving the gray scale display characteristics.

Figure 20:
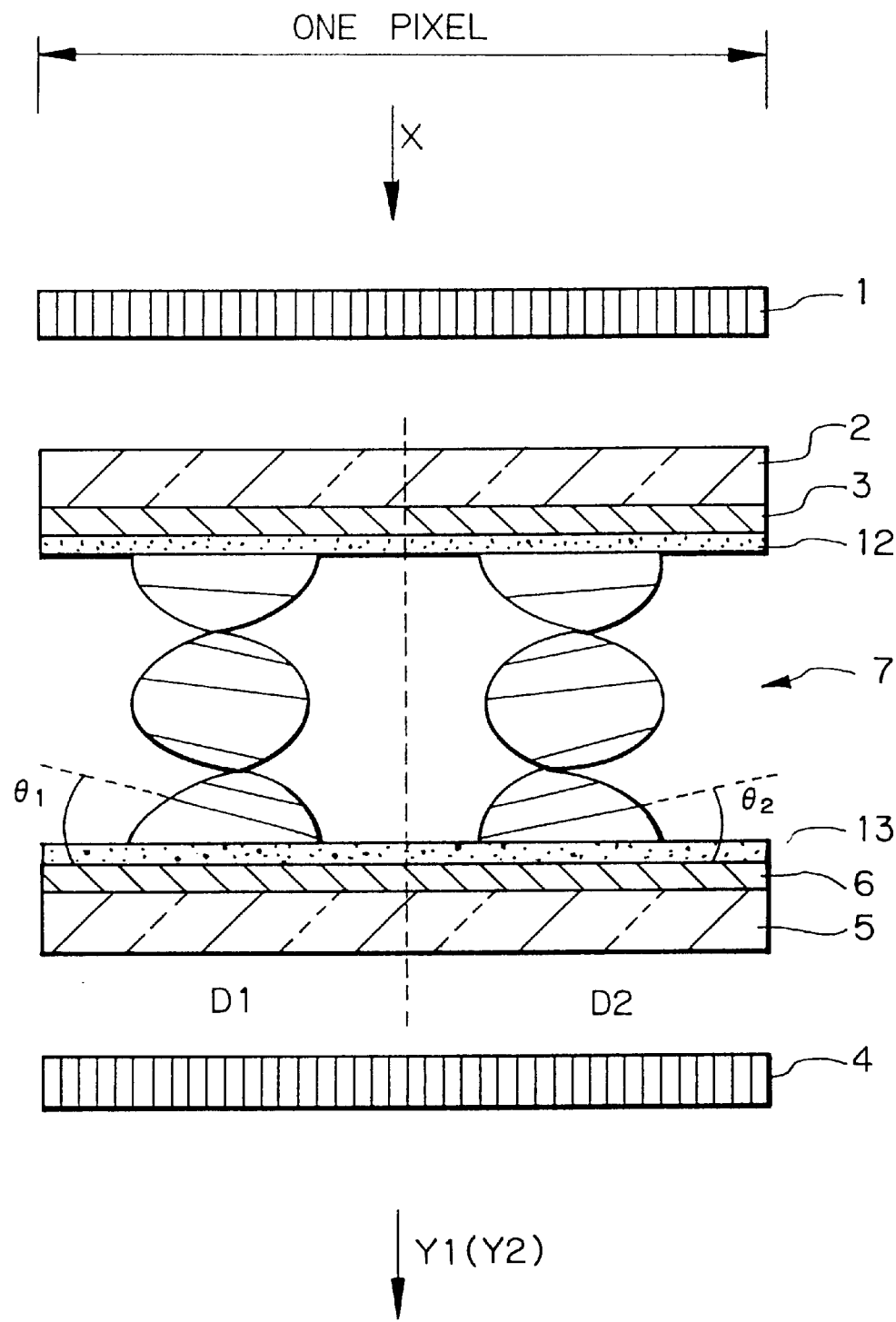
FIG. 20 is a cross-sectional view illustrating an eighth embodiment of the TN-mode LCD apparatus according the present invention.

In FIG. 20, which illustrates an eighth embodiment of the present invention, oriented layers 12 and 13 are formed on the transparent electrodes 3 and 6, respectively, of FIG. 1. Rubbing processes are performed on the oriented layers 12 and 13, to give an initial orientation to the liquid crystal layer 7. This suppresses the fluctuation of orientation of liquid crystal molecules caused by the injection of liquid crystal between the transparent substrates 2 and 5.

In addition, in FIG. 20, the direction of a rubbing process performed upon a domain D1 of the oriented layer 13 is different from the direction of a rubbing process performed upon a domain D2 of the oriented layer 13. As a result, the pretilt angle of liquid crystal molecules is dependent upon the domains D1 and D2 of the oriented layer 13. For example, the pretilt angle of the domain D1 is indicated by $\theta_1$, and the pretilt angle of the domain D2 is indicated by $\theta_2$. Therefore, there is discontinuity of the pretilt angle between the domains D1 and D2, which are independent of each other. Since the threshold voltage and saturation voltage of each domain are also dependent upon the pretilt angle, there are two threshold voltages arid two saturation voltages within one pixel. Therefore, although a large hysteresis is generated within each domain of one pixel, in other words, two different threshold voltages are generated microscopically within one pixel, the two different threshold voltages are summed within one pixel, so that the hysteresis of liquid crystal in the entire one pixel is also made small as shown in FIG. 5. In addition, the transition curve of the voltage-to-light transmittance characteristics is relatively sloped, so that the gray scale display characteristics can be improved.

Figure 21:
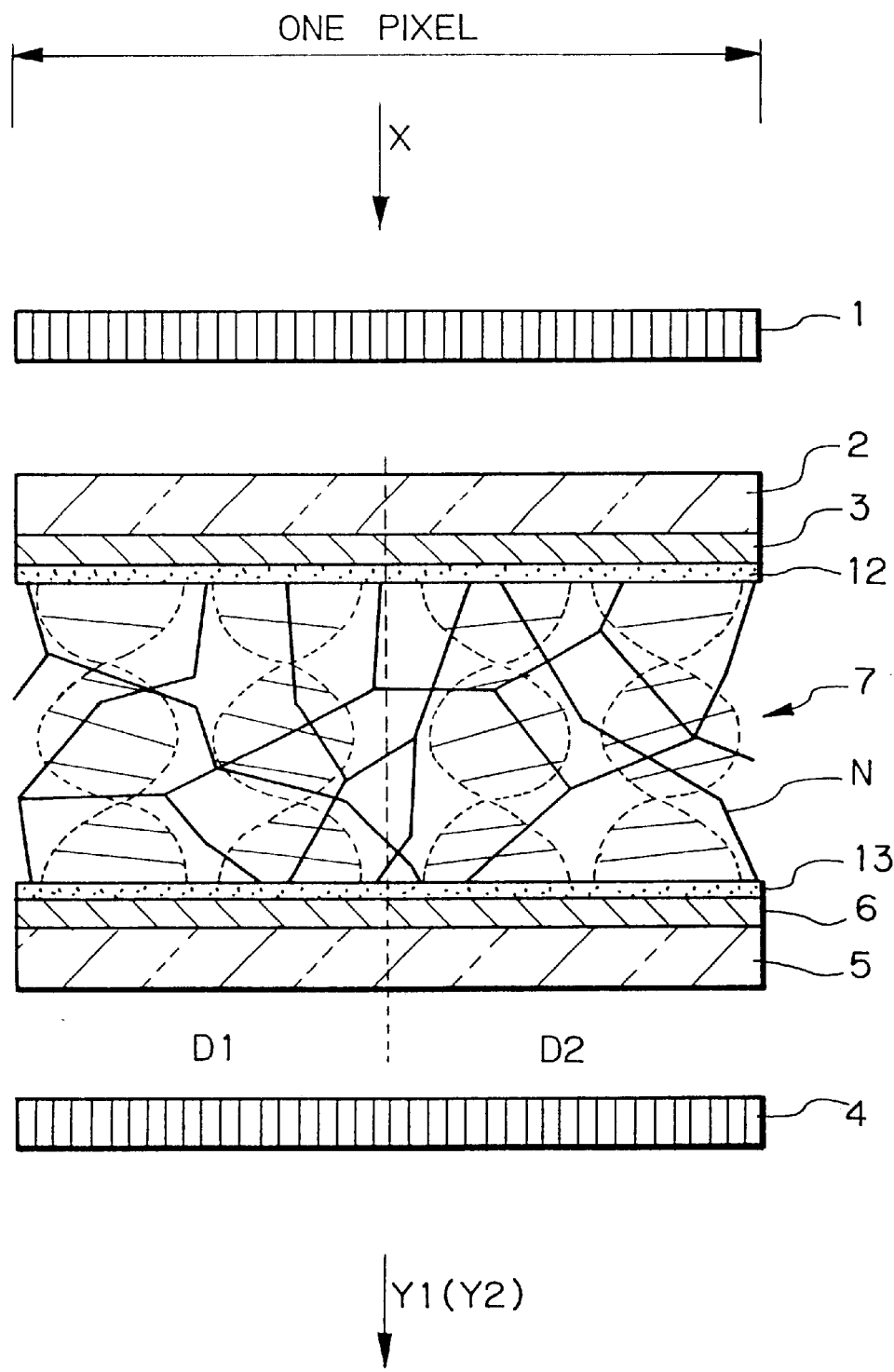
FIG. 21 is a cross-sectional view illustrating a ninth embodiment of the TN-mode LCD apparatus according to the present invention.

In FIG. 21, which illustrates a ninth embodiment of the present invention, oriented layers 12 and 13 are formed on the transparent electrodes 3 and 6, respectively, of FIG. 1. Rubbing processes are performed on the oriented layers 12 and 13, to give an initial orientation to the liquid crystal layer 7. This suppresses the fluctuation of orientation of liquid crystal molecules caused by the injection of liquid crystal between the transparent substrates 2 and 5.

In addition, in FIG. 21, the tilt angle of liquid crystal molecules is different in domains D1 and D2 by dispersing polymer into the liquid crystal layer 7. That is, about 0.1 to 5 weight percent of monomer and oligomer are mixed in liquid crystal before the injection of liquid crystal between the oriented layers 12 and 13. In this case, the monomer is converted by ultraviolet irradiation or heat into polymer, and the oligomer serves as an initiator for this polymerization. After the injection, the liquid crystal is heated so that the liquid crystal enters a liquid phase. Then, the liquid crystal is cooled while an electric field or a magnetic field is applied thereto. At a specified temperature during this cooling operation, the liquid crystal is subjected to ultraviolet or the like, so that the monomer is converted into a polymer network as indicated by N. Since the polymerization is carried out under an electric field or a magnetic field, the polymer network is arranged in accordance with the tilt angle of liquid crystal molecules. Therefore, even when the electric field applied between the transparent electrodes 3 and 6 is 0, the tilt angle of liquid crystal molecules is different in domains D1 and D2 within the bulk of the liquid crystal layer 7. As a result, when a voltage is applied between the transparent electrodes 3 and 6, the pretilt angle of liquid crystal molecules is dependent upon the domains D1 and D2 of the oriented layer 13. For example, the pretilt angle of the domain D1 is indicated by $\theta_1$, and the pretilt angle of the domain D2 is indicated by $\theta_2$. Therefore, there is discontinuity of the pretilt angle between the domains D1 and D2, which are independent of each other. Since the threshold voltage and saturation voltage of each domain are also dependent upon the pretilt angle, there are two threshold voltages and two saturation voltages within one pixel. Therefore, although a large hysteresis is generated within each domain of one pixel, in other words, two different threshold voltages are generated microscopically within one pixel, the two different threshold voltages are summed within one pixel, so that the hysteresis of liquid crystal in the entire one pixel is also made small as shown in FIG. 5. In addition, the transition curve of the voltage-to-light transmittance characteristics is relatively sloped, so that the gray scale display characteristics can be improved.

Figure 22:
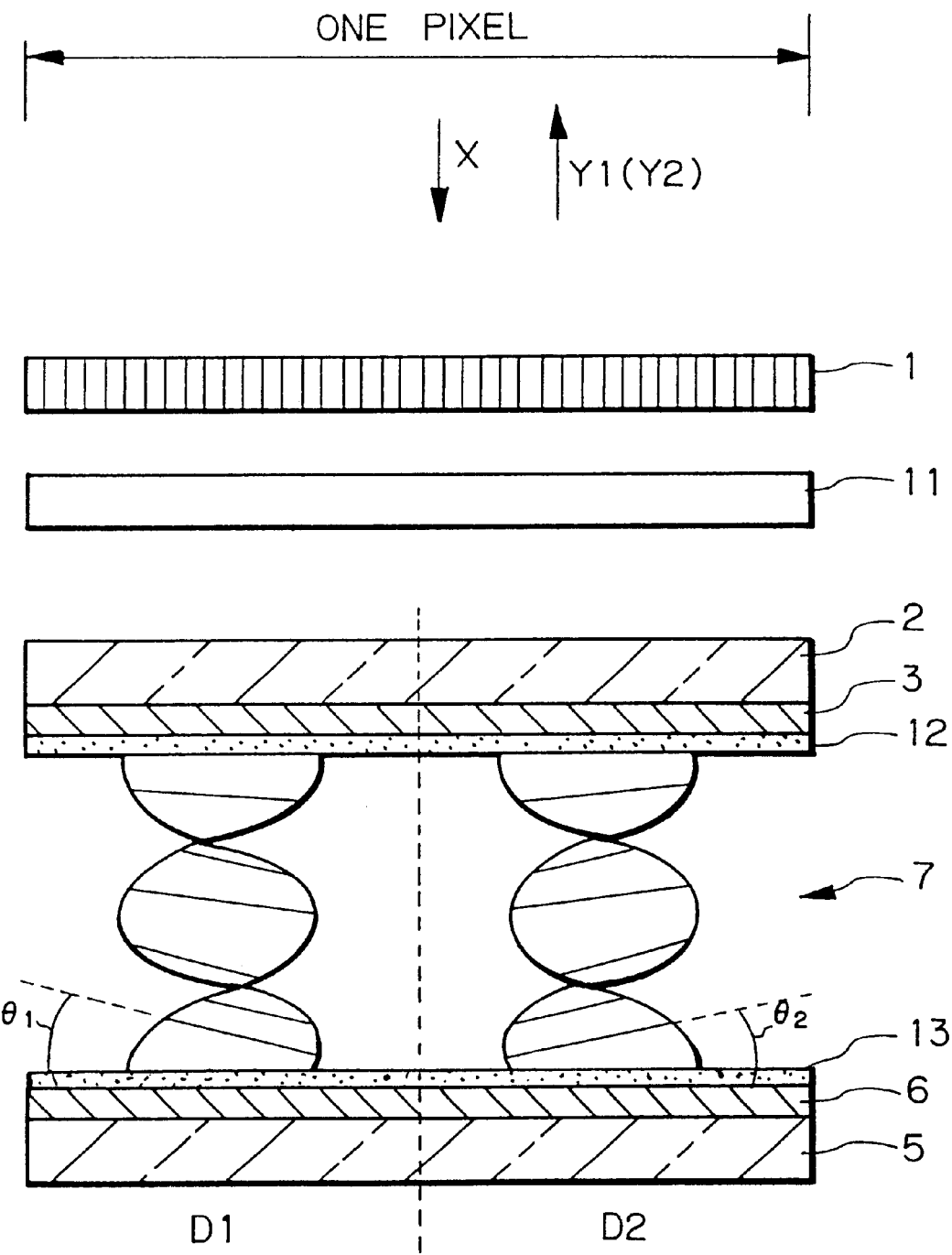
FIGS. 22 and 23 are cross-sectional views illustrating modifications of the apparatuses of FIGS. 20 and 21, respectively.
Figure 23:
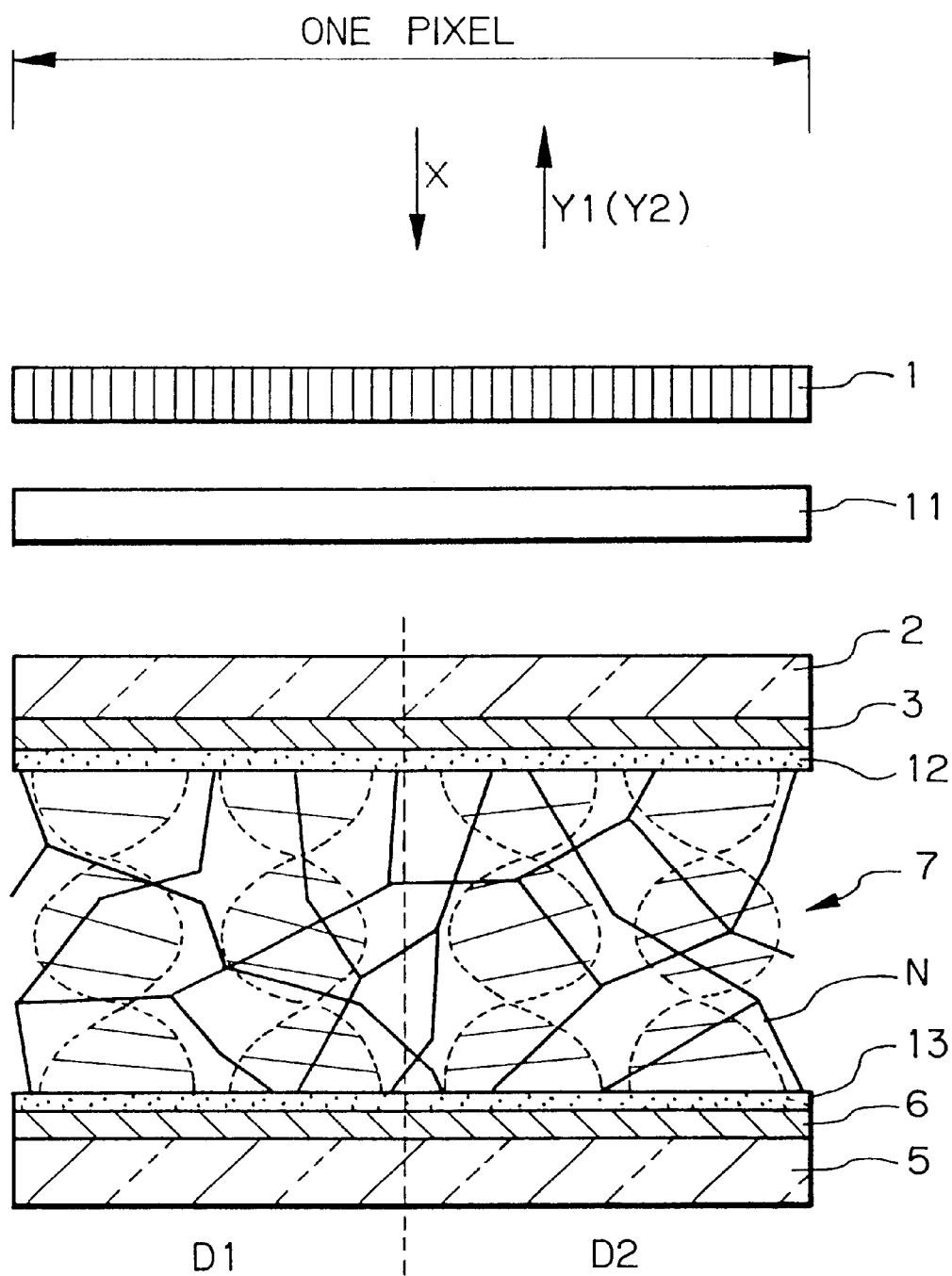

In FIGS. 22 and 23, the apparatuses of FIGS. 20 and 21, respectively, are applied to reflection-type TN-mode LCD apparatuses, which do not require back lights. That is, a reflective electrode 10 made of aluminum or the like is provided instead of the transparent electrode 6 of FIGS. 20 and 21. Also, a phase difference compensation plate 11 is inserted between the polarization plate 1 and the transparent substrate 2 of FIGS. 20 and 21. Further, the polarization plate 4 of FIGS. 20 and 21 is not provided. The transparent substrate 5 can be opaque, i.e., made of metal, polymer or ceramic.

In FIGS. 22 and 23, an incident light X as well as natural light is converted by the polarization plate 1 into a linearly polarized light. Then, this light penetrates the phase difference compensation plate 11, the transparent substrate 2 and the transparent electrode 3, and is incident to the liquid crystal layer 7. In the liquid crystal layer 7, while the plane of polarization of the incident light is changed by the double refraction characteristics of the liquid crystal layer 7, the light reaches the reflective electrode 10.

On the other hand, light reflected from the reflective electrode 10 is again incident to the liquid crystal layer 7. In the liquid crystal layer 7, while the plane of polarization of the incident light is changed by the double refraction characteristics of the liquid crystal layer 7, the light reaches the transparent electrode 3. Then, the light again penetrates the transparent electrode 3, the transparent substrate 2 and the phase difference compensation plate 11. As a result, only the frequency component of light in a specified direction passes through the polarization plate 1, thus obtaining an outgoing light Y1 or Y2.

In FIGS. 22 and 23, in the same way as in the eighth and ninth embodiments, the hysteresis of liquid crystal molecules is made small, thus improving the gray scale display characteristics.

Figure 24:
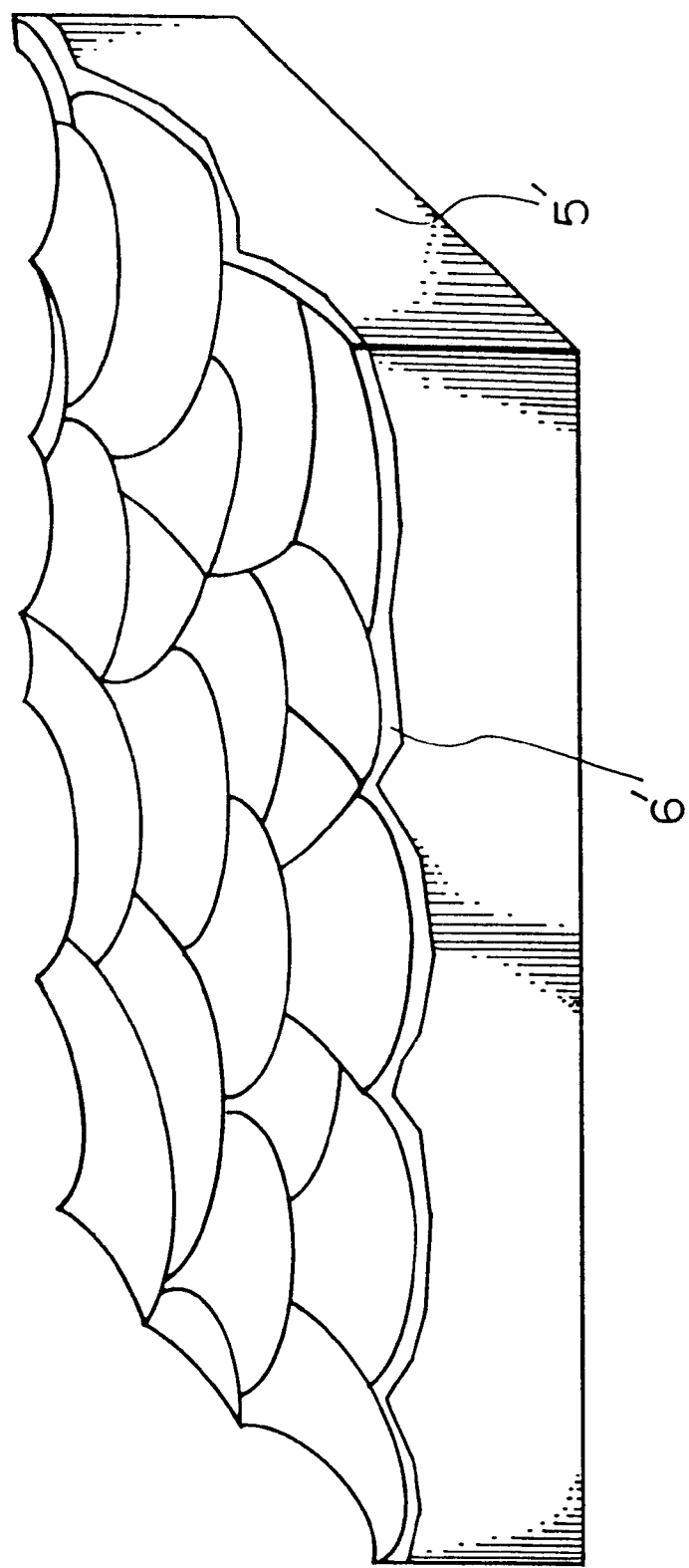
FIG. 24 is a perspective view for explaining the manufacturing steps of the transparent substrate and the transparent electrode of FIGS. 4, 7, 10, 12, 15 and 18.
Figure 25:
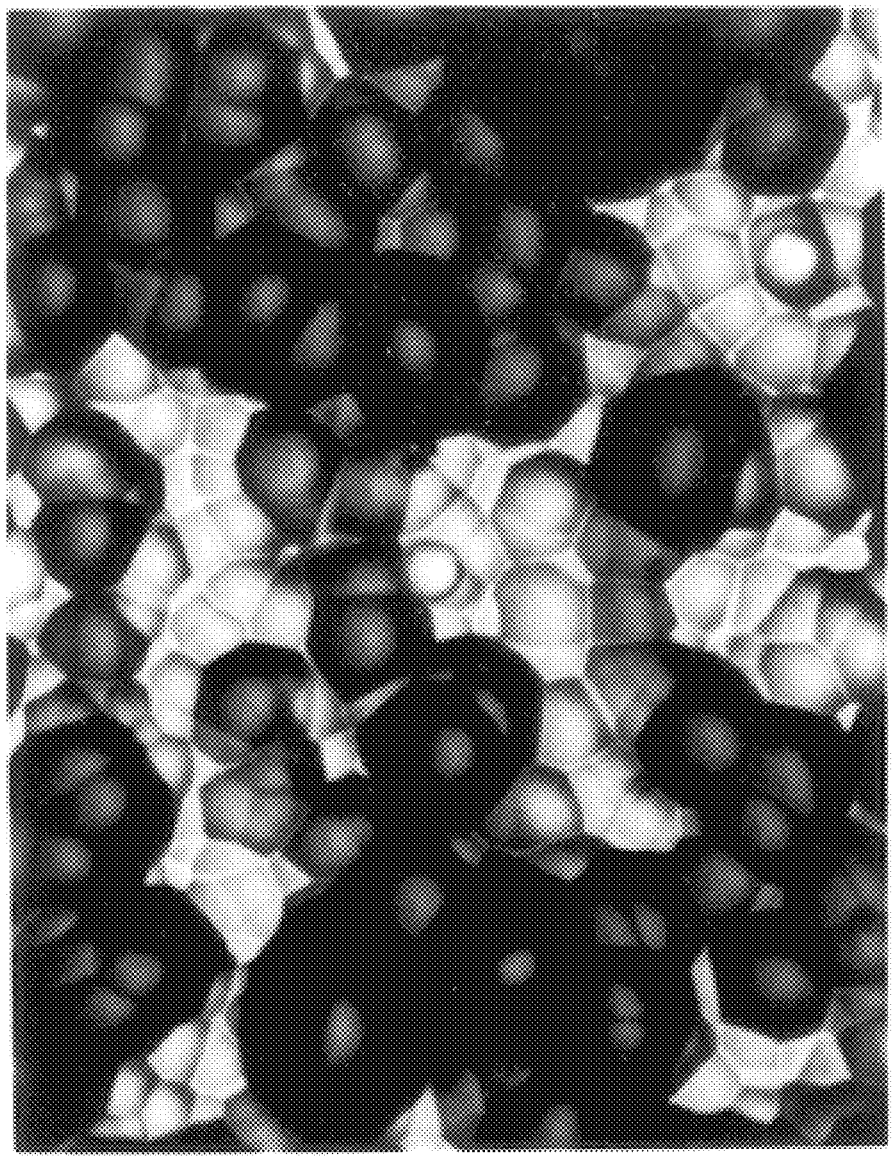
FIG. 25 is a photograph showing the state of liquid crystal molecules formed on the transparent electrode of FIG. 24.

The manufacturing steps of the transparent substrate 5' and the transparent electrode 6' of FIGS. 4, 7, 10, 12, 15 and 18 will be explained next with reference to FIGS. 24 and 25. First, a plane transparent substrate is polished by using a #1000 abrasive material, and then, is etched by 25 percent fluoric acid for about 3 minutes. As a result, a randomly uneven surface is formed on the transparent substrate 5'. Also, ITO is formed on the transparent substrate 5', thus obtaining the transparent electrode 6'. In this case, the depths of recess portions of the transparent electrode 6' are randomly changed within one pixel. Also, protrusion portions of the transparent electrode 6' are separated from each other by the recess portions thereof. A liquid crystal layer on the transparent electrode 6' was observed as shown in FIG. 25. In FIG. 25, white portions indicate ON state domains of liquid crystal molecules, and black portions indicate OFF state domains of liquid crystal molecules. Therefore, orientation defects are not generated, and ON state domains and OFF state domains are completely mixed, thus improving the gray scale display characteristics.

A first example of the manufacturing steps of the transparent substrate 5, the layer 8 and the transparent electrode 6' of FIGS. 6, 8, 11, 13, 17 and 19 will be explained next with reference to FIGS. 26A, 26B and 27.

Figure 26A:
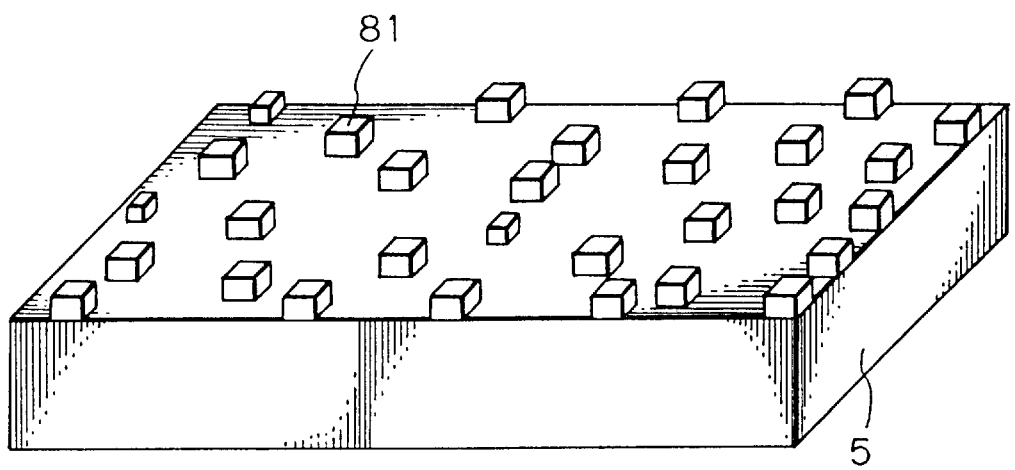
FIGS. 26A and 26B are perspective views for explaining the manufacturing steps of the transparent substrate, the layer and the transparent electrode of FIGS. 6, 8, 11, 13, 17 and 19.
Figure 27:
FIG. 27 is a photograph showing the state of liquid crystal molecules formed on the transparent electrode of FIG. 26B.

First, as illustrated in FIG. 26A, a plurality of pillar base elements 81 are randomly formed on a plane transparent substrate 5 within one pixel. In this case, note that the locations of the base elements 81 are randomly changed, and also, the heights of the base elements 81 are randomly changed.

Figure 26B:
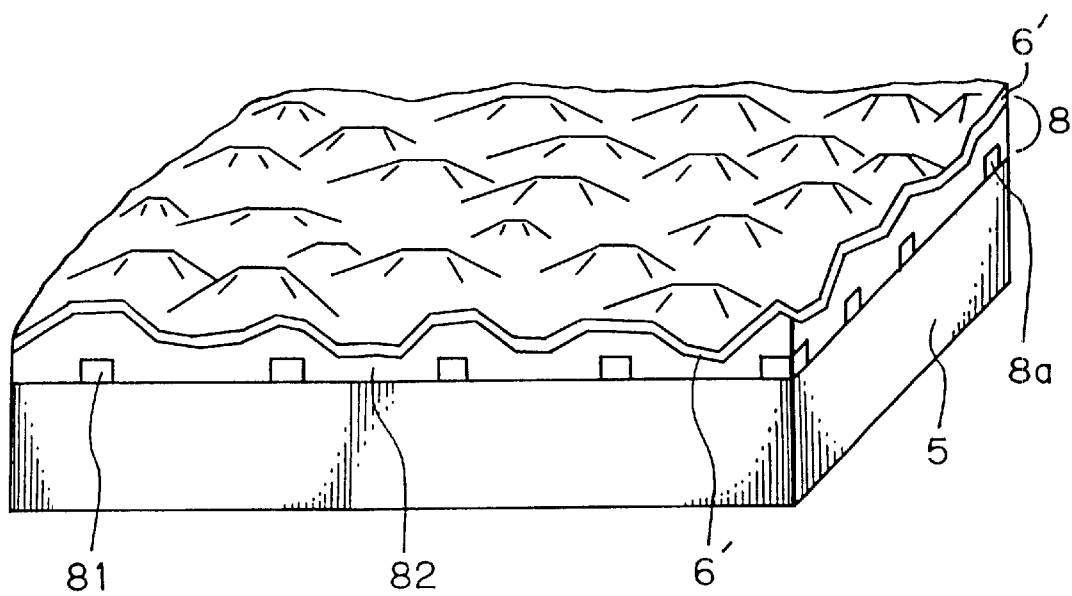

Next, as illustrated in FIG. 26B, an insulating layer 82 made of inorganic material or organic material such as polyimide or acrylic resin is formed on the transparent substrate 5. In this case, due to the pillar base elements 81, the surface of the insulating layer 82 is made uneven. Thus, the pillar base elements 81 and the insulating layer 82 form the uneven layer 8. Then, an ITO layer is coated on the uneven insulating layer 82 to form the transparent electrode 6'. The surface of the transparent electrode 6' is uneven due to the uneven surface of the insulating layer 82. In this case, protrusion portions are separated from each other by recess portions. A liquid crystal layer on the transparent electrode 6' was observed as shown in FIG. 27. In FIG. 27, white portions indicate ON state domains of liquid crystal molecules, and black portions indicate OFF state domains of liquid crystal molecules. Therefore, finger texture type orientation defects are hardly generated, and ON state domains and OFF state domains are mixed, thus improving the gray scale display characteristics.

A second example of the manufacturing steps of the transparent substrate 5, the layer 8 and the transparent electrode 6' of FIGS. 6, 8, 11, 13, 17 and 19 will be explained with reference to FIGS. 28A and 28B.

Figure 28A:
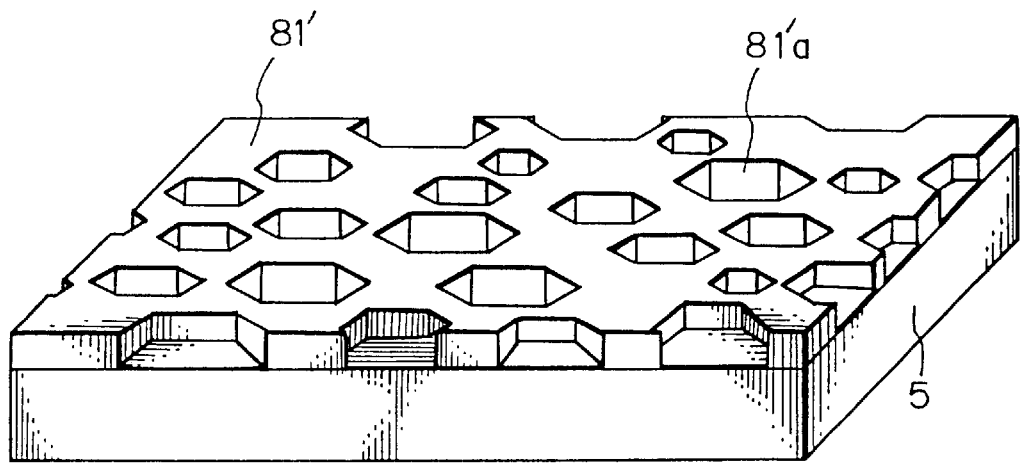
FIGS. 28A and 28B are other perspective views for explaining the manufacturing steps of the transparent substrate, the layer and the transparent electrode of FIGS. 6, 8, 11, 13, 17 and 19.

First, as illustrated in FIG. 28A, a base element 81' is formed on a plane transparent substrate 5. Then, the base element 81' is etched by a photolithography and etching process, so that a plurality of holes 81'a are perforated in the base element 81' within one pixel. In this case, the sizes of the holes 81'a are randomly changed within one pixel.

Figure 28B:
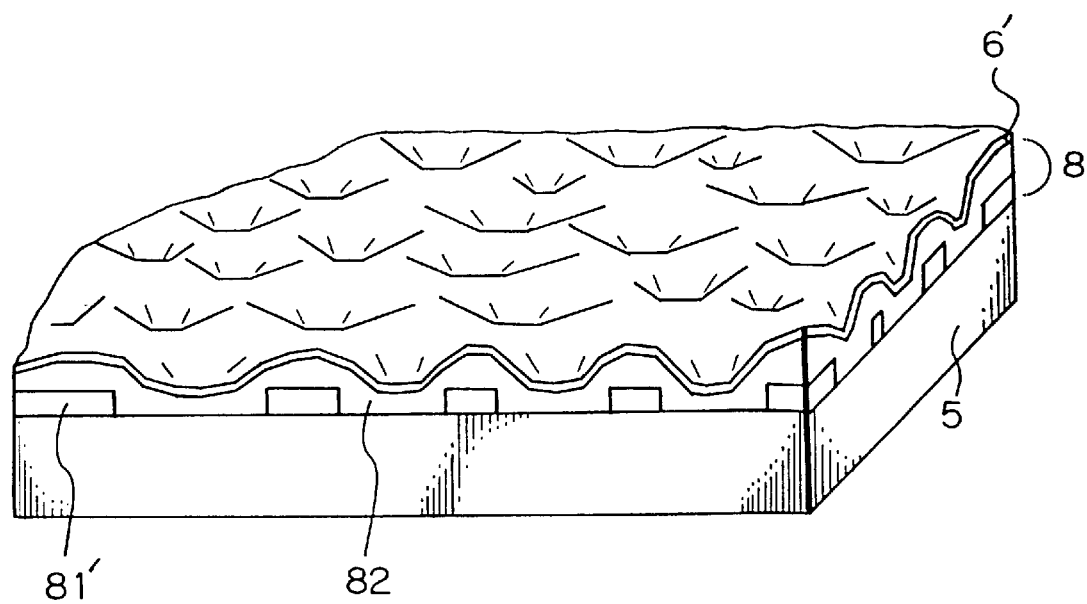

Next, as illustrated in FIG. 28B, an insulating layer 82 made of inorganic material or organic material such as polyimide or acrylic resin is formed on the transparent substrate 5. In this case, due to the base element 81', the surface of the insulating layer 82 is made uneven. Thus, the base elements 81' and the insulating layer 82 form the uneven layer 8. Then, an ITO layer is coated on the uneven insulating layer 82 to form the transparent electrode 6'. The surface of the transparent electrode 6' is uneven due to the uneven surface of the insulating layer 82. In this case, since the sizes of the holes 81'a are randomly changed within one pixel, the depths of recess portions of the transparent electrode 6' are randomly changed within one pixel. Also, recess portions are separated from each other by the protrusion portions. Even in this case, in a liquid crystal layer on the transparent electrode 6', finger texture type orientation defects are hardly generated, and ON state domains and OFF state domains are mixed, thus improving the gray scale display characteristics.

In the above-described embodiments, when color filters are combined with the apparatus, a full color LCD apparatus can be realized.

Also, in the above-described embodiments, when two-tone dye is mixed into the liquid crystal of the liquid crystal layer 7, a guest host type LCD apparatus can be realized.

As explained hereinabove, according to the present invention, the hysteresis of the voltage-to-light transmittance of the liquid crystal layer can be made small, to improve the gray scale display characteristics.

What is claimed is:

1. An active type liquid crystal display apparatus comprising:

first and second polarization plates;

first and second plane transparent substrates between said first and second polarization plates;

a layer having a randomly uneven surface and being formed on an inner surface of said second plane transparent substrate;

a first transparent electrode formed on an inner surface of said first transparent substrate;

a second transparent electrode formed on said layer; and a twisted-mode type liquid crystal layer provided between said first and second transparent electrodes, wherein
   a twisted angle of liquid crystal molecules in said twisted-mode type liquid crystal layer being between about 270° and 450°, and
   pretilt angles of liquid crystal molecules in the liquid crystal layer are fluctuated within one pixel.

2. An active type liquid crystal display apparatus comprising:
first arid second polarization plates;
first and second plane transparent substrates between said first and second polarization plates;
a layer having a randomly uneven surface and being formed on an inner surface of said second plane transparent substrate;
a first transparent electrode formed on an inner surface of said first transparent substrate;
a second transparent electrode formed on said layer;
a leveling layer buried in recess portions of said second transparent electrode; and
a twisted-mode type liquid crystal layer provided between said first transparent electrode and said leveling layer, wherein
said leveling layer has a permittivity not larger than a permittivity of said liquid crystal layer,
a twisted angle of liquid crystal molecules in said twisted-mode type liquid crystal layer being between about 270° and 450°, and
pretilt angles of liquid crystal molecules in the liquid crystal layer are fluctuated within one pixel.

3. An active type liquid crystal display apparatus comprising:
first and second polarization plates;
first and second plane transparent substrates between said first and second polarization plates;
first and second plane transparent electrodes between said first and second plane transparent substrates;
a layer having a randomly uneven surface and being formed on an inner surface of said second plane transparent electrode; and
a twisted-mode type liquid crystal layer provided between said first transparent electrode and said layer, wherein
said layer has a permittivity not larger than a permittivity of said liquid crystal layer,
a twisted angle of liquid crystal molecules in said twisted-mode type liquid crystal layer being between about 270° and 450°, and
pretilt angles of liquid crystal molecules in the liquid crystal layer are fluctuated within one pixel.

4. An active type liquid crystal display apparatus comprising:
a polarization plate;
a phase difference compensation layer provided on an inner side of said polarization plate;
first and second plane substrates provided on an inner side of said phase difference compensation layer, said first plane substrate being transparent;
a layer having a randomly uneven surface and being formed on an inner surface of said second plane substrate;
a first electrode formed on an inner surface of said first substrate, said first electrode being transparent;
a second electrode of a reflection type formed on said layer; and
a twisted-mode type liquid crystal layer provided between said first and second electrodes, wherein
a twisted angle of liquid crystal molecules in said twisted-mode type liquid crystal layer being between about 270° and 450°, wherein a thickness of said liquid crystal layer varies within a single pixel, and
pretilt angles of liquid crystal molecules in the liquid crystal layer are fluctuated within one pixel.

5. An active type liquid crystal display apparatus comprising:
a polarization plate;
a phase difference compensation layer provided on an inner side of said polarization plate;
first and second plane substrates, wherein said first substrate is provided on an inner side of said phase difference compensation layer, said first plane substrate being transparent;
a layer having a randomly uneven surface and being formed on an inner surface of said second plane substrate;
a first electrode formed on an inner surface of said first substrate, said first electrode being transparent;
a second electrode of a reflection type formed on said layer;
a leveling layer buried in recess portions of said second electrode; and
a twisted-mode type liquid crystal layer provided between said first electrode and said leveling layer, wherein
said leveling layer has a permittivity not larger than a permittivity of said liquid crystal layer,
a twisted angle of liquid crystal molecules in said twisted-mode type liquid crystal layer being between about 270° and 450°, wherein a thickness of said liquid crystal layer varies within a single pixel, and
pretilt angles of liquid crystal molecules in the liquid crystal layer are fluctuated within one pixel.

6. An active type liquid crystal display apparatus comprising:
a polarization plate;
a phase difference compensation layer provided on an inner side of said polarization plate;
first and second plane substrates provided on an inner side of said phase difference compensation layer, said first plane substrate being transparent;
first and second plane electrodes between said first and second plane substrates, said first plane electrode being transparent, said second plane electrode being of a reflection type;
a layer having a randomly uneven surface and being formed on an inner surface of said second plane electrode; and
a twisted-mode type liquid crystal layer provided between said first electrode and said
said layer has a permittivity not larger than a permittivity of said liquid crystal layer,
a twisted angle of liquid crystal molecules in said twisted-mode type liquid crystal layer being between about 270° and 450°, wherein a thickness of said liquid crystal layer varies within a single pixel, and
pretilt angles of liquid crystal molecules in the liquid crystal layer are fluctuated within one pixel.

7. An active type liquid crystal display apparatus comprising:
first and second polarization plates;
first and second plane transparent substrates between said first and second polarization plates;
a layer having a randomly uneven surface and being formed on an inner surface of said second plane transparent substrate;
a first transparent electrode formed on an inner surface of said first transparent substrate;
a second transparent electrode formed on said layer;

first and second oriented layers formed on inner surfaces of said first and second transparent electrodes, respectively, wherein said second oriented layer has an uneven inner surface; and a twisted-mode type liquid crystal layer provided between said first and second oriented layers, wherein said second oriented layer causes said liquid crystal layer to form a plurality of domains wherein there is discontinuity of the pretilt angle among individual domains whereupon pretilt angles of liquid crystal molecules in the liquid crystal layer are fluctuated within one pixel.

8. An active type liquid crystal display apparatus comprising:

a polarization plate;

a phase difference compensation layer provided on an inner side of said polarization plate;

first and second plane substrates provided on an inner side of said phase difference compensation layer, said first plane substrate being transparent, a layer having a randomly uneven surface and being formed on an inner surface of said second plane substrate;

a first electrode formed on an inner surface of said first substrate, said first electrode being transparent;

a second electrode of a reflection type formed on said layer;

first and second oriented layers formed on inner surfaces of said first and second electrodes, respectively, wherein said second oriented layer has an uneven-inner surface; and a twisted-mode type liquid crystal layer provided between said first and second oriented layers, wherein said second oriented layer causes said liquid crystal layer to form a plurality of domains wherein there is discontinuity of the pretilt angle among individual domains whereupon pretilt angles of liquid crystal molecules in the liquid crystal layer are fluctuated within one pixel.

* * * * *